United States Patent
Katayama et al.

(10) Patent No.: US 9,906,168 B2
(45) Date of Patent: Feb. 27, 2018

(54) POWER CONVERTING APPARATUS, CONTROL DEVICE, AND METHOD FOR CONTROLLING POWER CONVERTING APPARATUS

(71) Applicant: KABUSHIKI KAISHA YASKAWA DENKI, Kitakyushu-shi (JP)

(72) Inventors: Taisuke Katayama, Fukuoka (JP); Hiroshi Takagi, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 97 days.

(21) Appl. No.: 14/696,485

(22) Filed: Apr. 27, 2015

(65) Prior Publication Data

US 2015/0311800 A1    Oct. 29, 2015

(30) Foreign Application Priority Data

Apr. 28, 2014    (JP) ................................ 2014-093048

(51) Int. Cl.
*H02M 7/5395*    (2006.01)
*H02M 3/158*    (2006.01)
(Continued)

(52) U.S. Cl.
CPC ......... *H02M 7/5395* (2013.01); *H02M 3/158* (2013.01); *H02M 7/487* (2013.01);
(Continued)

(58) Field of Classification Search
CPC ........ H02M 3/158; H02M 7/487; H02M 7/49; H02M 7/5395; H02M 2001/0025;
(Continued)

(56) References Cited

U.S. PATENT DOCUMENTS 6,324,085 B2 * 11/2001 Kimura ................. H02M 7/538
                                                                          318/811
7,170,767 B2 *  1/2007 Bixel .................. H02M 5/4585
                                                                          363/65
(Continued)

FOREIGN PATENT DOCUMENTS

JP    09-140157    5/1997
JP    10-052062    2/1998
(Continued)

OTHER PUBLICATIONS

Hou, "A Discontinuous PWM for Three Level Converters with Constant Common-Mode Voltage", 2013 1st International Future Energy Electronics Conference (IFEEC), IEEE, Nov. 3, 2013, pp. 395-399, XP032531624.
(Continued)

*Primary Examiner* — Kyle J Moody
(74) *Attorney, Agent, or Firm* — Mori & Ward, LLP

(57) ABSTRACT

A power converting apparatus is provided. The power converting apparatus includes a power converter configured to output a voltage to a load, and a controller configured to output a PWM signal which is generated in response to a voltage command to the power converter. The power converter includes a plurality of switching elements driven based on the PWM signal. The controller is configured to generate the PWM signal such that a first period during which a zero voltage is outputted and a second period during which a non-zero voltage is outputted are adjusted according to the voltage command. The controller is allowed to output the PWM signal which is set such that one first period and one or more second periods exist within an updating cycle of the voltage command, to the power converter.

17 Claims, 25 Drawing Sheets

(51) Int. Cl.
*H02M 7/487* (2007.01)
*H02M 7/49* (2007.01)
*H02M 1/00* (2006.01)
*H02M 1/32* (2007.01)
*H02M 7/5387* (2007.01)

(52) U.S. Cl.
CPC ...... *H02M 7/49* (2013.01); *H02M 2001/0025* (2013.01); *H02M 2001/0054* (2013.01); *H02M 2001/327* (2013.01); *H02M 2007/53876* (2013.01); *Y02B 70/1491* (2013.01)

(58) Field of Classification Search
CPC ... H02M 2001/0054; H02M 2001/327; H02M 2007/53876; Y02B 70/1491
USPC ....... 363/16, 17, 34, 35, 56.02, 98, 131, 132
See application file for complete search history.

(56) References Cited

U.S. PATENT DOCUMENTS

| | | | | |
|---|---|---|---|---|
| 8,619,446 B2* | 12/2013 | Liu | .......... | H02M 1/12 363/71 |
| 8,750,008 B2* | 6/2014 | Sugiyama | ............... | H02M 1/15 363/131 |
| 2005/0128777 A1* | 6/2005 | Yamanaka | ........ | H02M 7/53875 363/98 |
| 2013/0107589 A1* | 5/2013 | Tanaka | .................... | H02M 7/49 363/65 |
| 2013/0155740 A1* | 6/2013 | Takubo | ............. | H02M 7/53871 363/98 |
| 2014/0092658 A1 | 4/2014 | Hara et al. | | |
| 2015/0369852 A1* | 12/2015 | Mitsuda | ................ | H02M 5/458 324/550 |
| 2016/0276837 A1* | 9/2016 | Manjrekar | ............. | H02J 3/383 |

FOREIGN PATENT DOCUMENTS

| | | |
|---|---|---|
| JP | 2000-060196 | 2/2000 |
| JP | 2005-160147 | 6/2005 |
| JP | 2011-109739 | 6/2011 |
| JP | 2014-073027 | 4/2014 |

OTHER PUBLICATIONS

Hongwei et al., "SVPWM Equivalent Algorithm Based on Carrier for Five-Phase Voltage Source Inverter", Power Electronics and Motion Control Conference (IPEMC), 2012 7th International, IEEE, Jun. 2, 2012, pp. 758-762, XP032215675.

Extended European Search Report for corresponding EP Application No. 15165401.9-1809, dated Oct. 1, 2015.

Japanese Office Action for corresponding JP Application No. 2014-093048, dated Jul. 25, 2017.

* cited by examiner

POWER CONVERTING APPARATUS, CONTROL DEVICE, AND METHOD FOR CONTROLLING POWER CONVERTING APPARATUS

CROSS-REFERENCE TO RELATED APPLICATION

The present disclosure contains subject matter related to that disclosed in Japanese Priority Patent Application No. 2014-093048 filed Japan Patent Office on April 28, 2014. The contents of this application are incorporated herein by reference in their entirety.

BACKGROUND OF THE INVENTION

Field of the Invention

Embodiments disclosed herein relate to a power converting apparatus, a control device, and a method for controlling the power converting apparatus.

Description of the Related Art

In a conventional power converting apparatus such as an inverter or the like, there is known a technique in which a PWM (Pulse Width Modulation) signal is generated by comparing a carrier signal with a voltage command and a switching element is controlled by the PWM signal.

In this power converting apparatus, there is known a technique in which a switching loss is reduced by reducing a carrier frequency and performing PWM control. For example, Japanese Patent Application Publication No. 2011-109739 discloses a technique in which a switching loss is reduced by switching a high carrier frequency and a low carrier frequency depending on the magnitude of distortion of an output voltage.

SUMMARY OF THE INVENTION

In accordance with an aspect of an embodiment, there is provided a power converter converting apparatus for converting electric power between a power source and a load, including: a power converter configured to output a voltage to the load; and a controller configured to output a PWM signal which is generated in response to a voltage command to the power converter, wherein the power converter includes a plurality of switching elements driven based on the PWM signal, wherein the controller is configured to generate the PWM signal such that a first period during which a zero voltage is outputted and a second period during which a non-zero voltage is outputted are adjusted according to the voltage command, and wherein the controller is allowed to output the PWM signal which is set such that one first period and one or more second periods exist within an updating cycle of the voltage command, to the power converter.

In accordance with another aspect of the embodiment, there is provided a control device for controlling a power converter, including: a command generator configured to generate a voltage command; and a signal generator configured to generate a PWM signal such that a first period during which a zero voltage is outputted and a second period during which a non-zero voltage is outputted are adjusted according to the voltage command, and output the PWM signal to the power converter, wherein the signal generator is allowed to output the PWM signal which is set such that one first period and one or more second periods exist within an updating cycle of the voltage command, to the power converter.

In accordance with still another aspect of the embodiment, there is provided a method for controlling a power converting apparatus, including: a command generating process for generating a voltage command; and a signal generating process for generating a PWM signal such that a first period during which a zero voltage is outputted and a second period during which a non-zero voltage is outputted are adjusted according to the voltage command, and outputting the PWM signal to a power converter, wherein the signal generating process includes outputting the PWM signal which is set such that one first period and one or more second periods exist within an updating cycle of the voltage command.

DESCRIPTION OF THE EMBODIMENTS

Embodiments of a power converting apparatus, a control device, and a method for controlling the power converting apparatus disclosed herein will now be described in detail with reference to the accompanying drawings. It is noted that descriptions regarding a controller of the power converting apparatus relating to each embodiment disclosed herein also serve as descriptions regarding an example of a control device relating to that embodiment. Further, it is noted that descriptions regarding operations and a processing flow of the controller and its elements relating to each embodiment disclosed herein also serve as descriptions regarding a method for controlling the power converting apparatus relating to that embodiment. The present disclosure is not limited to the embodiments to be described below.

[1. First Embodiment]

Figure 1A:
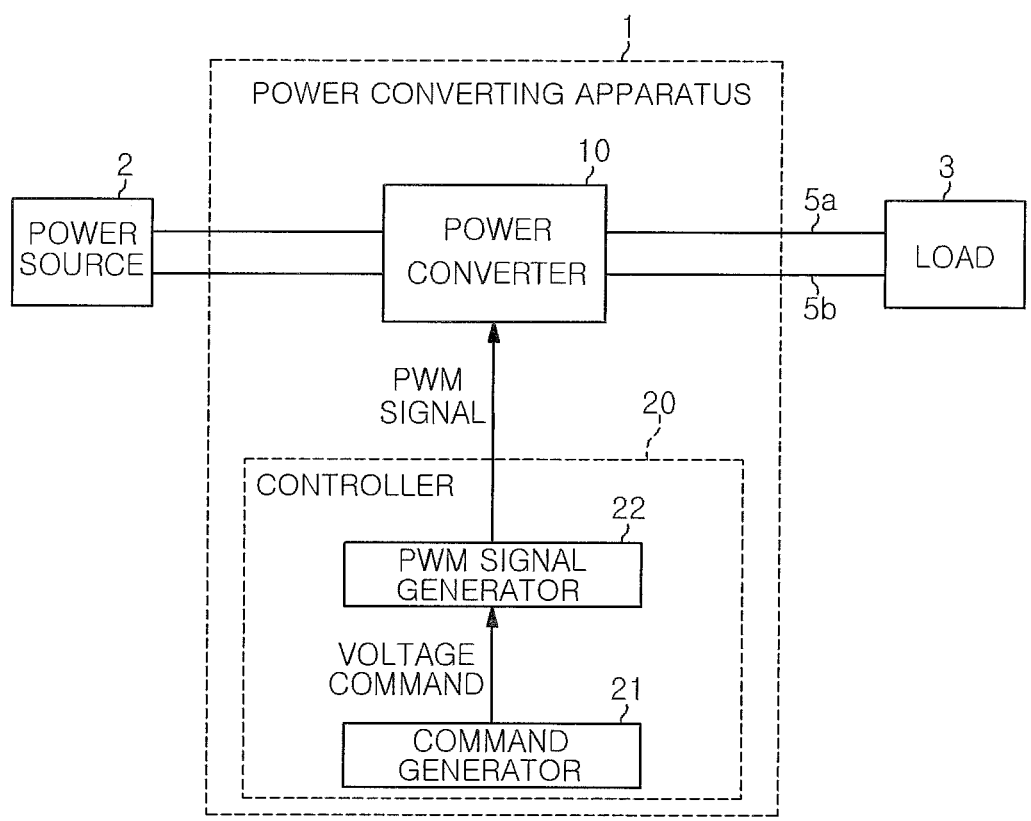
FIG. 1A is a view showing a configuration example of a power converting apparatus relating to a first embodiment.

FIG. 1A is a view showing a configuration example of a power converting apparatus relating to a first embodiment. As shown in FIG. 1A, the power converting apparatus 1 relating to the first embodiment converts electric power supplied from a power source 2 to specified electric power and outputs the specified electric power to a load 3. For example, if the power source 2 is a DC power source and if the load 3 is an AC motor, the power converting apparatus 1 converts DC power supplied from the power source 2 to AC power and outputs the AC power to the load 3. The power source 2 may be, e.g., an AC power source and the load 3 may be, e.g., a power system.

[1.1. Power Converting Apparatus 1]

The power converting apparatus 1 may include a power converter 10 for outputting a voltage to the load 3 and a controller 20 for outputting a PWM signal which is generated in response to a voltage command to the power converter 10.

The power converter 10 may include a plurality of switching elements driven based on a PWM signal (e.g., the PWM signal outputted from the controller 20) and may be connected between the power source 2 and the load 3. The power converter 10 outputs, e.g., an AC voltage power having a single phase or multiple phases, to the load 3 via output lines 5a and 5b provided between the power converter 10 and the load 3.

The controller 20 generates the PWM signal such that a first period during which a zero voltage is outputted and a second period during which a non-zero voltage is outputted are adjusted according to a voltage command. Further, the controller 20 is allowed to output to the power converter 10 a PWM signal which is set such that one first period and one or more second periods exist within an updating cycle of a voltage command. For instance, the controller 20 outputs, for each updating cycle of the voltage command, the PWM signal which causes one first period and one or more second periods combined within said each updating cycle of the voltage command.

The controller 20 may include a command generator 21 and a PWM signal generator 22. The command generator 21 generates a voltage command and outputs the voltage command to the PWM signal generator 22. The voltage command is a signal whose voltage value or the like is referred to in generating a PWM signal. For example, the voltage command disclosed herein may be also regarded as a reference voltage and include one or more phase voltage commands respectively corresponding to one or more phases of an AC voltage outputted from the power converter 10. However, for the sake of convenience, the voltage command relating to the present embodiment will be described based on a case of a single phase AC voltage. The command generator 21 may maintain or change a voltage value of a voltage command. For example, the command generator 21 updates a voltage value of a voltage command every specified updating cycle based on one or more specified conditions.

The PWM signal generator 22 generates a PWM signal pursuant to the voltage command and outputs the PWM signal to the power converter 10. The PWM signal generator 22 may have a first mode and a second mode as a PWM control mode and select one of the first mode and the second mode based on specified conditions.

For example, the PWM signal generator 22 selects the first mode if the temperature of the power converter 10 is lower than a predetermined value and selects the second mode if the temperature of the power converter 10 is equal to or higher than the predetermined value. In the second mode, the number of turn-on times of a PWM pulse, namely the number of switching times, becomes equal to one half of that available in the first mode. This makes it possible to reduce a switching loss generated in the power converter 10.

Figure 1B:
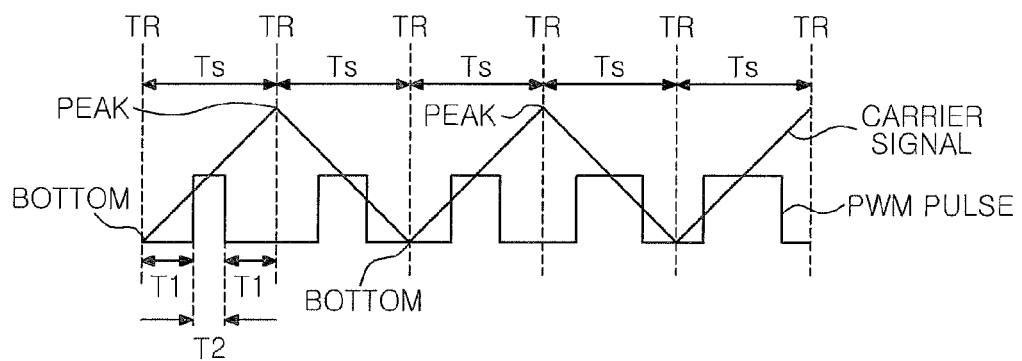
FIG. 1B is an explanatory view of a first mode of a PWM control mode in the power converting apparatus relating to the first embodiment.
Figure 1C:
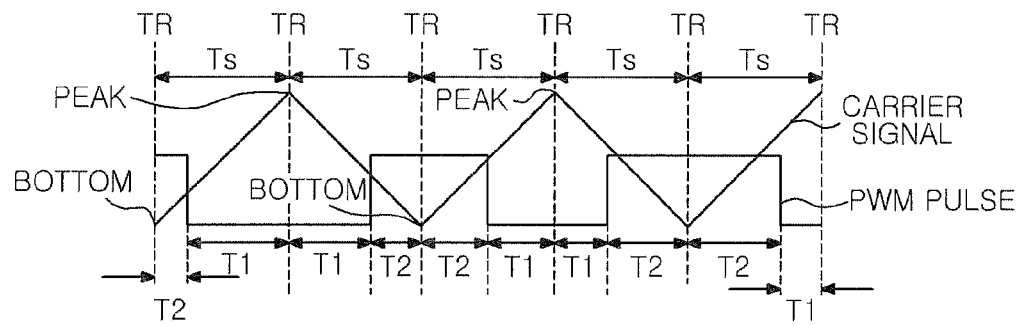
FIG. 1C is an explanatory view of a second mode of the PWM control mode in the power converting apparatus relating to the first embodiment.

FIGS. 1B and 1C are explanatory views of the first mode and the second mode, respectively. As shown in FIG. 1B, in case of first mode, for each (and preferably, every) voltage command updating cycle Ts, the PWM signal generator 22 repeatedly outputs to the power converter 10 a PWM signal having a pattern which is set to sequentially cause a first period T1, a second period T2, and a first period T1 in that order. The first period T1 is a period during which a zero voltage is outputted to via output lines 5a and 5b of the power converter 10. The second period T2 is a period during which a non-zero voltage is outputted to via the output lines 5a and 5b.

In the first mode, the timings of a peak (ridge) and a bottom (valley) of a carrier signal are included in the first period T1. By using these timings as updating timings TR, the PWM signal generator 22 updates the voltage command to be compared with the carrier signal.

As shown in FIG. 1C, in case of the second mode, the PWM signal generator 22 alternately outputs, for each (and preferably, every) voltage command updating cycle Ts, a PWM signal having a first pattern and a PWM signal having a second pattern to the power converter 10, wherein the first pattern is set such that one first period T1 and one second period T2 exist within an updating cycle Ts with the first period T1 followed by the second period T2, and the second pattern is set such that one first period T1 and one second period T2 exist within an updating cycle Ts with the second period T2 followed by the first period T1.

In the second mode, the timings of a peak and a bottom of a carrier signal are alternately included in the first period T1 or the second period T2. By using these timings as updating timings TR, the PWM signal generator 22 updates the voltage command to be compared with the carrier signal. The peak of the carrier signal indicates a position where the value of a waveform of the carrier signal becomes largest. The bottom of the carrier signal indicates a position where the value of a waveform of the carrier signal becomes smallest.

As shown in FIGS. 1B and 1C, in the second mode, the PWM signal generator 22 can make the number of turn-on times of a PWM pulse, namely the number of switching times, equal to one half of that available in the first mode. This makes it possible to reduce a switching loss generated in the power converter 10.

In the PWM signal generator 22, when the PWM control mode is the first mode and the second mode, the voltage command updating timings TR remain the same and the voltage command updating cycle Ts remains unchanged. For that reason, it is possible to suppress an increase in the dead time required until the voltage command as a voltage is outputted to the load 3.

In the descriptions made herein, the first mode and the second mode are provided as the PWM control mode and an element of the power converting apparatus, e.g., the controller, is operable in any one of the first mode and the second mode. However, by executing the second mode, it is possible to reduce a switching loss while suppressing an increase in the dead time required until the voltage command is outputted. Thus, the power converting apparatus 1 may be configured to execute only the second mode. This holds true in the power converting apparatuses relating to other embodiments which will be described later.

Now, configuration examples of the power converter 10 and the controller 20 of the power converting apparatus 1 relating to the first embodiment will be described in more detail. Hereinafter, description will be made on an example in which the power converter 10 converts DC power to single-phase AC voltage and outputs the AC voltage to the load 3 and in which the controller 20 generates a PWM signal by a carrier comparison method.

[1.2. Power Converter 10]

Figure 2:
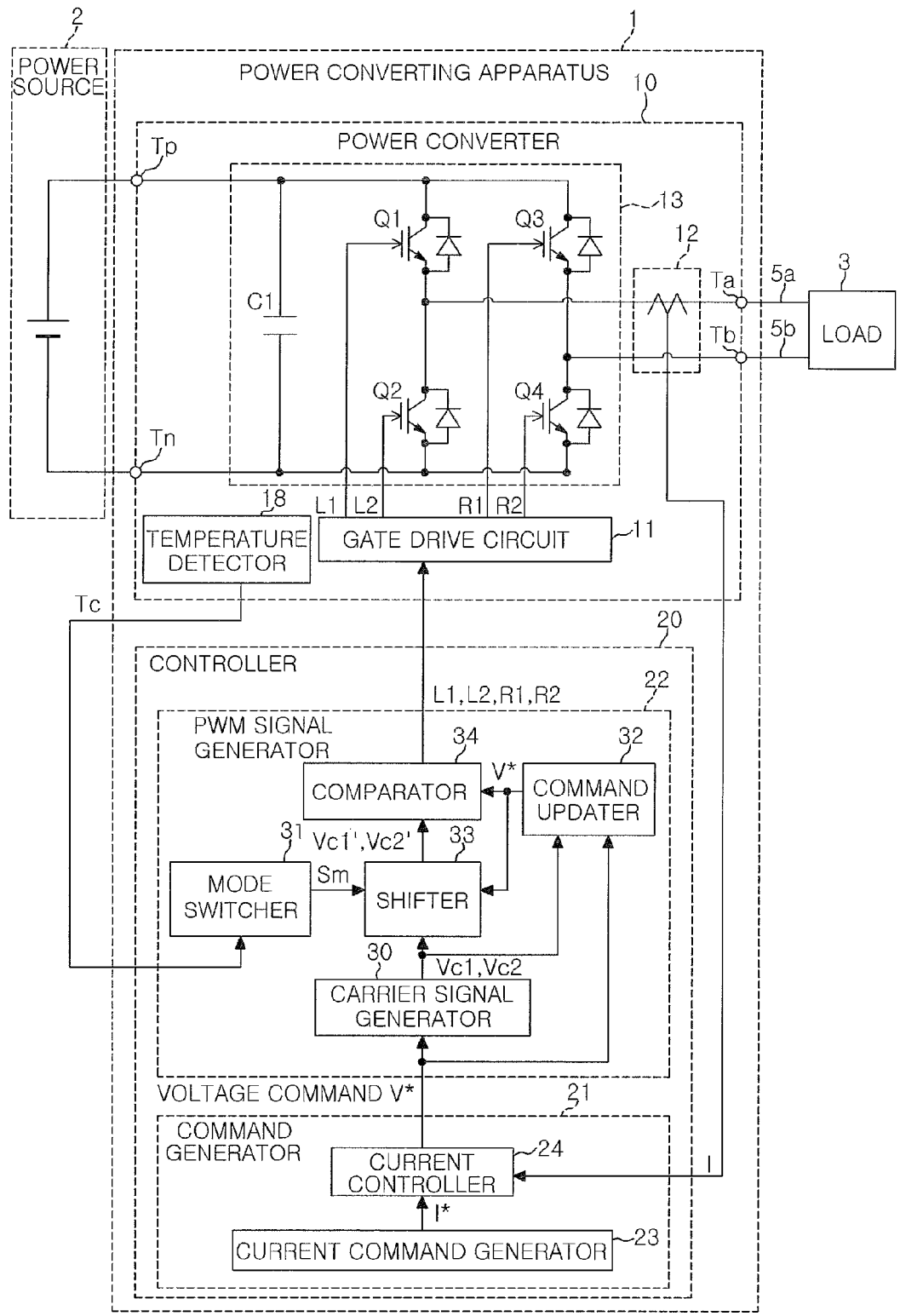
FIG. 2 is a view showing a configuration example of the power converting apparatus relating to the first embodiment.

FIG. 2 is a view showing configuration examples of the power converter 10 and the controller 20. As shown in FIG. 2, the power converter 10 may include input terminals Tp and Tn, output terminals Ta and Tb, a single-phase inverter circuit 13, a gate drive circuit 11, a current detector 12 and a temperature detector 18.

The input terminal Tp is connected to a positive electrode of the power source 2 while the input terminal Tn is connected to a negative electrode of the power source 2. The output terminals Ta and Tb are connected to the load 3. The power source 2 is a DC power source. The load 3 is, e.g., a single-phase AC motor.

The single-phase inverter circuit 13 may include switching elements Q1 to Q4 and a capacitor C1. The switching elements Q1 to Q4 are bridge-connected to one another and are connected to the load 3 through the output terminals Ta and Tb. A protective rectifying element is parallel-connected to each of the switching elements Q1 to Q4. The switching elements Q1 to Q4 may be, e.g., a semiconductor device such as an IGBT (Insulated Gate Bipolar Transistor), a MOSFET (Metal-Oxide-Semiconductor Field-Effect Transistor) or the like.

The gate drive circuit 11 amplifies PWM signals L1, L2, R1, and R2 outputted from the controller 20 and outputs the amplified PWM signals L1, L2, R1, and R2 to the gates of the switching elements Q1 to Q4. Thus, the power converter 10 converts the DC voltage inputted from the power source 2 through the input terminals Tp and Tn to an AC voltage using the switching operations of the switching elements Q1 to Q4 and outputs the converted AC voltage to the load 3 through the output terminals Ta and Tb.

The current detector 12 detects a current (hereinafter referred to as "current I") flowing between the power converter 10 and the load 3. The current detector 12 may be, e.g., a current sensor which makes use of a Hall element as a magneto-electric conversion element. The temperature detector 18 detects, e.g., a temperature (hereinafter referred to as "detection temperature Tc") within or around the power converter 10.

[1.3. Controller 20]

As shown in FIG. 2, the controller 20 may include a command generator 21 and a PWM signal generator 22. The command generator 21 may include a current command generator 23 and a current controller 24. The PWM signal generator 22 may include a carrier signal generator 30, a mode switcher 31, a command updater 32, a shifter 33, and a comparator 34.

The current command generator 23 generates a current command I*. The current controller 24 generates a voltage command V* such that a deviation between the current command I* and the output current I becomes zero.

The carrier signal generator 30 generates and outputs carrier signals Vc1 and Vc2. The carrier signals Vc1 and Vc2 are signals whose positive and negative polarities are inverted with each other. The carrier signals Vc1 and Vc2 are triangular wave signals but may be, e.g., saw-tooth wave signals.

The mode switcher 31 outputs a mode signal Sm to the shifter 33 and switches the first mode and the second mode based on one or more conditions which may be preset. For example, if the detection temperature Tc is lower than a predetermined value, the mode switcher 31 outputs a mode signal Sm indicative of the first mode to the shifter 33. If the detection temperature Tc is equal to or higher than the predetermined value, the mode switcher 31 outputs a mode signal Sm indicative of the second mode to the shifter 33.

The command updater 32 inputs the carrier signals Vc1 and Vc2 and the voltage command V*. By using the timings of the peak and the bottom of the carrier signals Vc1 and Vc2 as the updating timings TR, the command updater 32 updates, every updating timing TR, the voltage command V* outputted to the comparator 34. Thus, the command updater 32 can output the voltage command V* generated by the command generator 21 after the updating timing TR to the comparator 34 at the next updating timing TR.

The shifter disclosed herein is allowed to relatively shift, with respect to one or more carrier signals generated from the carrier signal generator, one or more phase voltage commands which are to be compared by the comparator, wherein the phase voltage commends are relatively shifted based on one of a peak value and a bottom value of the carrier signals.

For instance, if the mode signal Sm indicative of the first mode is outputted from the mode switcher 31, the shifter 33 relating to the present embodiment directly outputs the carrier signals Vc1 and Vc2 acquired from the command updater 32, as carrier signals Vc1' and Vc2', without shifting the carrier signals Vc1 and Vc2.

On the other hand, if the mode signal Sm indicative of the second mode is outputted from the mode switcher 31, the shifter 33 shifts the carrier signals Vc1 and Vc2 based on the voltage command V* updated by the command updater 32 and outputs the shifted carrier signals Vc1 and Vc2 as carrier signals Vc1' and Vc2'. For example, the shifter 33 shifts one of the carrier signals Vc1 and Vc2 so as to coincide with a peak value or a bottom value and shifts the other in the reverse direction.

The comparator 34 compares the carrier signals Vc1' and Vc2' with the voltage command V* and generates PWM signals L1, L2, R1, and R2 based on a result of the comparison. The comparator 34 outputs the PWM signals L1, L2, R1, and R2 to the gate drive circuit 11.

Now, the relationship between the carrier signals Vc1 and Vc2, the carrier signals Vc1' and Vc2' and the voltage command V* will be described in detail with reference to FIGS. 3A to 3C.

Figure 3A:
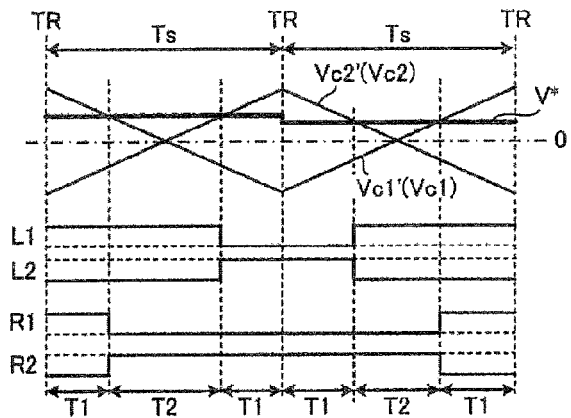
FIG. 3A is an explanatory view of a first mode.

FIG. 3A is an explanatory view of the first mode. As shown in FIG. 3A, in case of the first mode, the comparator 34 of the PWM signal generator 22 compares the carrier signals Vc1' and Vc2' having the same values as the carrier signals Vc1 and Vc2 with the voltage command V* and generates PWM signals L1, L2, R1, and R2. Thus, every updating cycle Ts of the voltage command V*, the PWM signal generator 22 repeatedly outputs a PWM signal having a control pattern in which the PWM signal migrates in the order of a first period T1, a second period T2 and a first period T1.

Figure 3B:
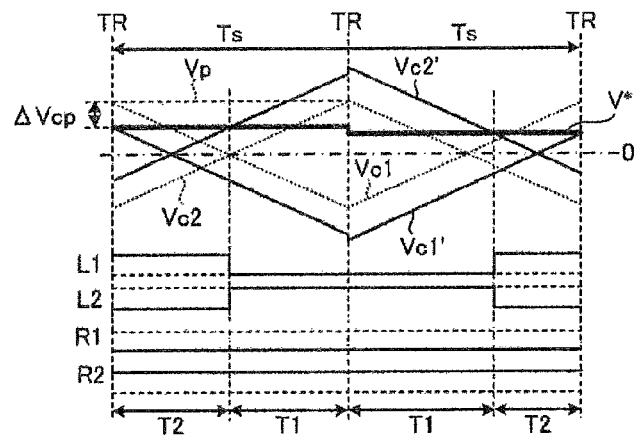
FIG. 3B is an explanatory view of a second mode in case where a voltage command is positive.

FIG. 3B is an explanatory view of the second mode in case where the voltage command V* is positive. If the voltage command V* is positive and if the PWM control mode is the second mode, the shifter 33 of the PWM signal generator 22 finds a difference ΔVcp between the peak value Vp of the carrier signals Vc1 and Vc2 and the updated voltage command V*.

The shifter 33 generates a carrier signal Vc1' by subtracting the difference ΔVcp from the carrier signal Vc1 and generates a carrier signal Vc2' by adding the difference ΔVcp to the carrier signal Vc2. The comparator 34 compares the voltage command V* updated by the command updater 32 with the carrier signals Vc1' and Vc2' outputted from the shifter 33 and outputs the comparison results as PWM signals L1, L2, R1, and R2.

In the example shown in FIG. 3B, the PWM signal generator 22 makes sure that the bottom of the carrier signal Vc2 exists within the second period T2. Alternatively, the PWM signal generator 22 may make sure that the bottom of the carrier signal Vc2 exists within the first period T1. In this case, the PWM signal generator 22 generates PWM signals L1 and L2 by comparing the carrier signal Vc1' with the voltage command V* and generates PWM signals R1 and R2 by comparing the carrier signal Vc2' with the voltage command V*.

Figure 3C:
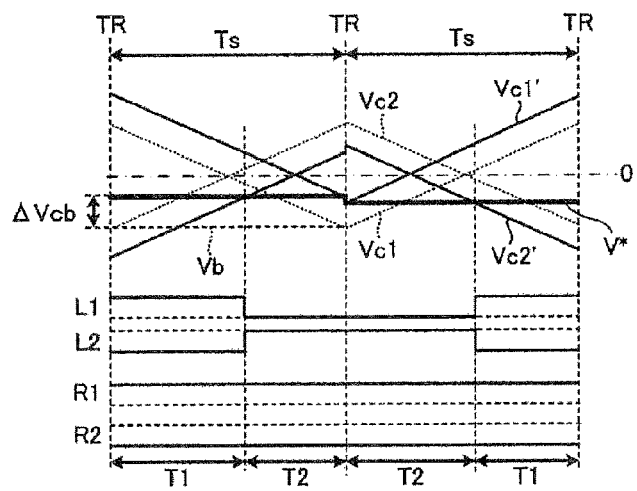
FIG. 3C is an explanatory view of a third mode in case where an output voltage command is positive.

FIG. 3C is an explanatory view of the second mode in case where the voltage command V* is negative. If the voltage command V* is negative and if the PWM control mode is the second mode, the shifter 33 of the PWM signal generator 22 finds a difference ΔVcb between the bottom value Vb of the carrier signals Vc1 and Vc2 and the updated voltage command V*.

The shifter 33 generates a carrier signal Vc1' by adding the difference ΔVcb to the carrier signal Vc1 and generates a carrier signal Vc2' by subtracting the difference ΔVcb from the carrier signal Vc2. The comparator compares the voltage command V* updated by the command updater 32 with the carrier signals Vc1' and Vc2' outputted from the shifter 33 and outputs the comparison results as PWM signals L1, L2, R1, and R2.

In the example shown in FIG. 3C, the PWM signal generator 22 makes sure that the bottom of the carrier signal Vc2 exists within the first period T1. Alternatively, the PWM signal generator 22 may make sure that the bottom of the carrier signal Vc2 exists within the second period T2. In this case, the PWM signal generator 22 generates PWM signals L1 and L2 by comparing the carrier signal Vc1' with the voltage command V* and generates PWM signals R1 and R2 by comparing the carrier signal Vc2' with the voltage command V*.

As described above, in case of the second mode, every updating cycle Ts of the voltage command V*, the PWM signal generator 22 alternately outputs a PWM signal having a control pattern in which the PWM signal migrates in the order of a first period T1 and a second period T2 during one updating cycle Ts and a PWM signal having a control pattern in which the PWM signal migrates in the order of a second period T2 and a first period T1 during one updating cycle Ts. Thus, as shown in FIG. 1B, in the second mode, the PWM signal generator 22 can make the number of turn-on times of a PWM pulse, namely the number of switching times, equal to one half of that available in the first mode. This makes it possible to reduce a switching loss generated in the power converter 10.

Furthermore, the PWM signal generator 22 does not change the updating cycle Ts of the voltage command V* in any of the first and second modes. It is therefore possible to suppress an increase in the dead time required until the voltage command V* as a voltage is outputted to the load 3. Therefore, as compared with a case where the dead time is allowed to become longer, it is possible to increase the gain of the current controller 24 and to perform current control with high responsiveness.

Figure 4:
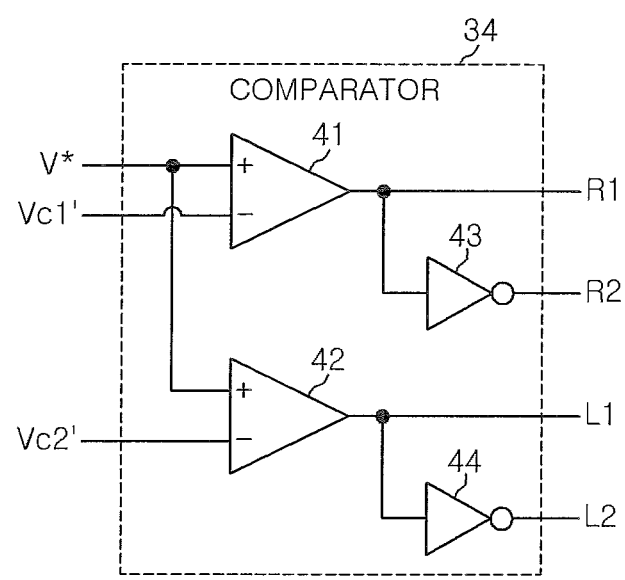
FIG. 4 is a view showing a configuration example of a comparator shown in FIG. 2.

FIG. 4 is a view showing a configuration example of the comparator 34. As shown in FIG. 4, the comparator 34 includes comparators 41 and 42 and NOT circuits 43 and 44. The comparator 41 compares the voltage command V* with the carrier signal Vc1'. If the voltage command V* is equal to or higher than the carrier signal Vc1', the comparator 41 outputs a high level signal. If the voltage command V* is lower than the carrier signal Vc1', the comparator 41 outputs a low level signal.

The comparator 42 compares the voltage command V* with the carrier signal Vc2'. If the voltage command V* is equal to or higher than the carrier signal Vc2', the comparator 42 outputs a high level signal. If the voltage command V* is lower than the carrier signal Vc2', the comparator 42 outputs a low level signal. The NOT circuit 43 inverts the output of the comparator 41 and outputs the inverted output of the comparator 41. The NOT circuit 44 inverts the output of the comparator 42 and outputs the inverted output of the comparator 42.

The comparator 34 outputs the output of the comparator 41 as a PWM signal R1 and outputs the output of the NOT circuit 43 as a PWM signal R2. Furthermore, the comparator 34 outputs the output of the comparator 42 as a PWM signal L1 and outputs the output of the NOT circuit 44 as a PWM signal L2.

The configuration of the comparator 34 is not limited to the configuration shown in FIG. 4. As an alternative example, it may be possible to employ a configuration in which four comparators are installed so as to output PWM signals L1, L2, R1, and R2.

[1.4. Processing in Controller 20]

Figure 5:
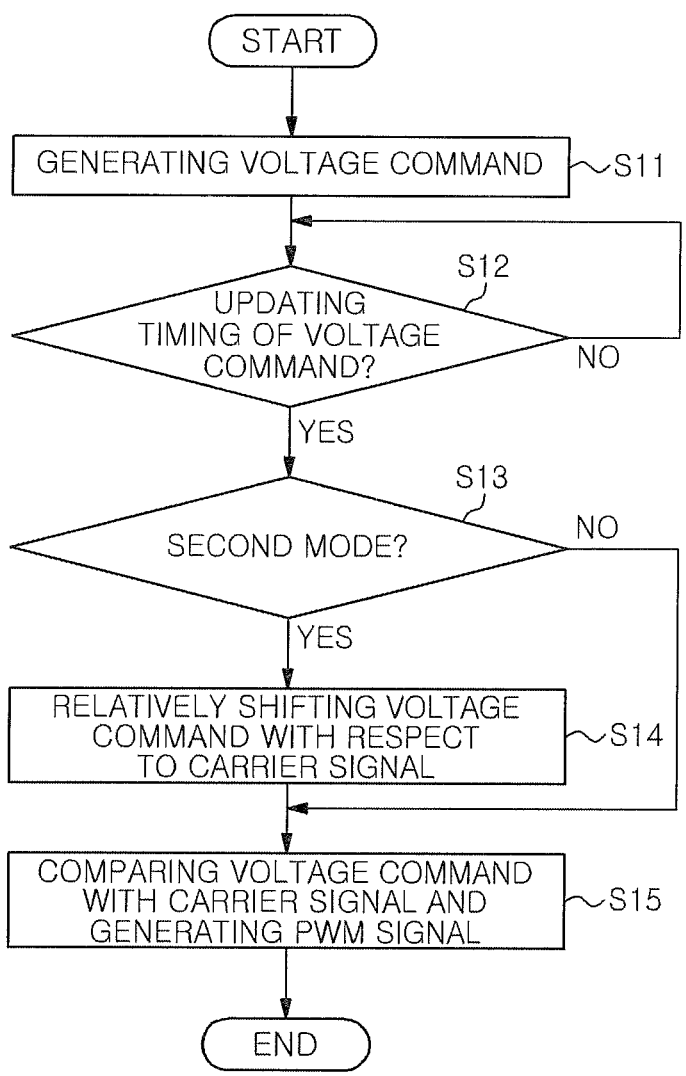
FIG. 5 is a flowchart illustrating one example of a processing flow of a controller shown in FIG. 2.

Now, description will be made on one example of the processing flow of the controller 20. FIG. 5 is a flowchart illustrating one example of the processing flow of the controller 20.

As shown in FIG. 5, the command generator 21 of the controller 20 generates a voltage command V* (step S11). Then, the PWM signal generator 22 of the controller 20 determines whether now is the updating timing TR of the voltage command V* (step S12). If it is determined that now is not the updating timing TR of the voltage command V* (if No at step S12), the PWM signal generator 22 repeatedly performs the processing of step S12.

If it is determined that now is the updating timing TR of the voltage command V* (if Yes at step S12), the PWM signal generator 22 determines whether it is the second mode (step S13). For example, if the voltage command V* is smaller than a predetermined value, the PWM signal generator 22 determines that it is the second mode.

If it is determined that it is the second mode (if Yes at step S13), the PWM signal generator 22 relatively shifts the voltage command V* with respect to the carrier signals Vc1 and Vc2 (step S14). For example, the PWM signal generator 22 shifts the carrier signals Vc1 and Vc2 depending on the difference ΔVcp (or the difference ΔVcb) between the peak value Vp (or the bottom value Vb) of the carrier signals Vc1 and Vc2 and the voltage command V*. Thus, the voltage command V* is relatively shifted with respect to the carrier signals Vc1 and Vc2.

If the processing of step S14 is completed or if it is determined at step S13 that it is not the second mode (if No at step S13), the PWM signal generator 22 compares the voltage command V* with the carrier signals Vc1' and Vc2' and generates PWM signals L1, L2, R1, and R2 (step S15).

Meanwhile, the method for controlling the power converting apparatus relating to the present embodiment may include, e.g., a command generating process and a signal generating process, and correspond to the processing follow of the controller 20 and/or its elements as described above. Specifically, the processing flow at step S11 may be an example or an element of the command generating process, and the processing follow at steps S12 to S15 may be an example or an element of the signal generating process.

The controller 20 may also be an example of the control device relating to the present embodiment and include a microcomputer including, e.g., a CPU (Central Processing Unit), a ROM (Read Only Memory), a RAM (Random Access Memory), an input/output port, and the like, and various kinds of circuits. The CPU of the microcomputer realizes control of the command generator 21 and the PWM signal generator 22 by reading out and executing a program stored in the ROM. At least one or all of the command generator 21 and the PWM signal generator 22 may be configured by the hardware such as an ASIC (Application Specific Integrated Circuit), an FPGA (Field Programmable Gate Array) or the like.

As described above, every updating cycle Ts of the voltage command V*, the power converting apparatus 1 relating to the first embodiment outputs to the power converter 10 a PWM signal in which one first period T1 and one or more second periods T2 are combined with each other. Thus, the power converting apparatus 1 can suppress an increase in the dead time required until the voltage command V* outputted from the command generator 21 is outputted as a voltage (a voltage pursuant to the voltage command V*) from the power converter 10.

[2. Second Embodiment]

Next, description will be made on a power converting apparatus relating to a second embodiment. The power converting apparatus relating to the second embodiment differs from the power converting apparatus 1 relating to the first embodiment in that the power converting apparatus of the second embodiment is a serial multiplex power converter which converts a DC voltage to a three-phase AC voltage and outputs the three-phase AC voltage. In the following description, the constituent elements having the same functions as those of the power converting apparatus 1 will be designated by like reference symbols. No duplicate description will be made thereon.

Figure 6:
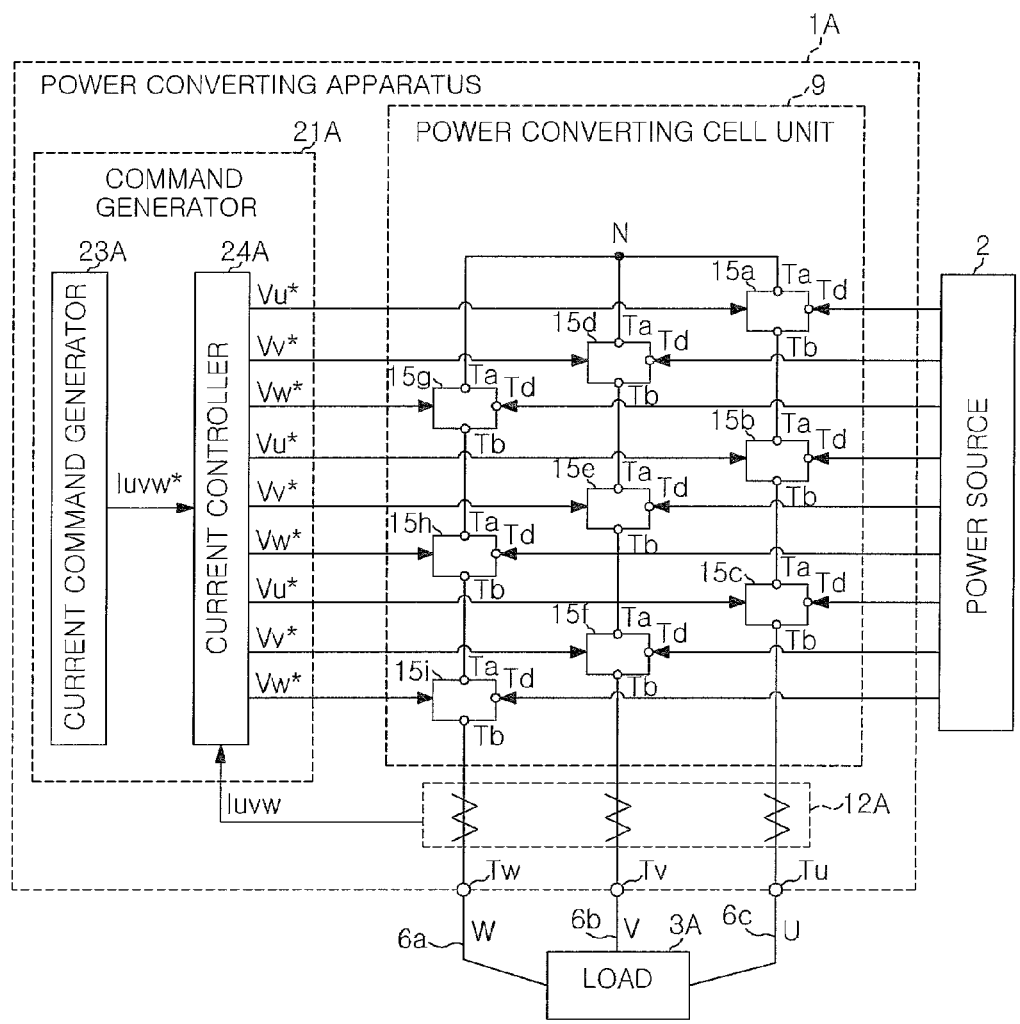
FIG. 6 is a view showing a configuration example of a power converting apparatus relating to a second embodiment.

FIG. 6 is a view showing a configuration example of a power converting apparatus 1A relating to the second embodiment. The power converting apparatus 1A includes a power converting cell unit 9, a current detector 12A and a command generator 21A and outputs a three-phase AC current to a load 3A (e.g., a three-phase AC motor or a power system).

As shown in FIG. 6, the power converting cell unit 9 includes nine single-phase power converting cells 15a to 15i (hereinafter often generically referred to as "single-phase power converting cell 15"). The single-phase power converting cells 15a to 15i are divided into three groups of single-phase power converting cells in a corresponding relationship with the U-phase, V-phase, and W-phase of the load 3A.

Specifically, one end of a single-phase power converting cell group configured by serially connecting the output terminals of the single-phase power converting cells 15a to 15c is connected to a neutral point N while the other end thereof is connected to a U-phase terminal of the load 3A. Furthermore, one end of a single-phase power converting cell group configured by serially connecting the output terminals of the single-phase power converting cells 15d to 15f is connected to the neutral point N while the other end thereof is connected to a V-phase terminal of the load 3A. Moreover, one end of a single-phase power converting cell group configured by serially connecting the output terminals of the single-phase power converting cells 15g to 15i is connected to the neutral point N while the other end thereof is connected to a W-phase terminal of the load 3A.

The current detector 12A detects phase currents Iu, Iv, and Iw (hereinafter referred to as "output phase current Iuvw") which flow between the power converting cell unit 9 and the U-phase, V-phase, and W-phase terminals of the load 3A. The current detector 12A may be, e.g., a current sensor which makes use of a Hall element as a magneto-electric conversion element.

Figure 7:
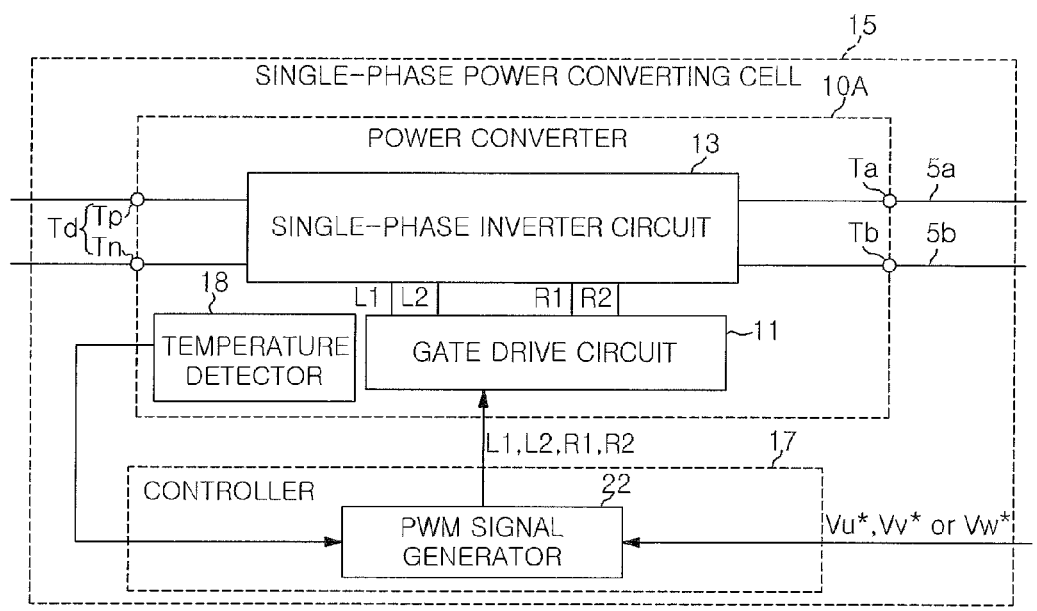
FIG. 7 is a view showing a configuration example of a single-phase power converting cell.

FIG. 7 is a view showing a configuration example of the single-phase power converting cell 15. As shown in FIG. 7, the single-phase power converting cell 15 includes a power converter 10A, a controller 17 and a temperature detector 18. The power converter 10A includes a gate drive circuit 11 and a single-phase inverter circuit 13. Only one temperature detector 18 may be provided with respect to the nine single-phase power converting cells 15a to 15i.

The single-phase power converting cell 15 includes input terminals Td (input terminals Tp and Tn) and output terminals Ta and Tb. The single-phase power converting cell 15 converts a DC voltage inputted from the power source 2 to the input terminals Td, to a single-phase AC voltage and outputs the single-phase AC voltage through the output terminals Ta and Tb.

For example, the power converter 10A outputs a voltage obtained by adding up the output voltages of the single-phase power converting cells 15a to 15c, to the U-phase terminal of the load 3A. The power converter 10A outputs a voltage obtained by adding up the output voltages of the single-phase power converting cells 15d to 15f, to the V-phase terminal of the load 3A. The power converter 10A outputs a voltage obtained by adding up the output voltages of the single-phase power converting cells 15g to 15i, to the W-phase terminal of the load 3A.

The controller 17 includes a PWM signal generator 22. The PWM signal generator 22 generates PWM signals L1, L2, R1, and R2 based on the below-mentioned phase voltage command outputted from the command generator 21A.

The command generator 21A includes a current command generator 23A and a current controller 24A. The current command generator 23A generates a phase current command Iuvw*. The phase current command Iuvw* includes phase current commands Iu*, Iv*, and Iw*. The current controller 24A generates a phase voltage command Vuvw* such that a deviation between the phase current command Iuvw* and the output phase current Iuvw becomes zero. The phase voltage command Vuvw* includes phase voltage commands Vu*, Vv*, and Vw* which are U-phase, V-phase, and W-phase voltage commands. The command generator 21A outputs the phase voltage command Vu* as a voltage command V* to the single-phase power converting cells 15a to 15c. The command generator 21A outputs the phase voltage command Vv* as a voltage command V* to the single-phase power converting cells 15d to 15f. The command generator 21A outputs the phase voltage command Vw* as a voltage command V* to the single-phase power converting cells 15g to 15f.

As described above, each of the single-phase power converting cells 15a to 15i of the power converting apparatus 1A relating to the second embodiment includes the PWM signal generator 22. Accordingly, just like the power converting apparatus 1 relating to the first embodiment, in the second mode, the PWM signal generator 22 can make the number of turn-on times of a PWM pulse, namely the number of switching times, equal to one half of that available in the first mode. This makes it possible to reduce a switching loss while suppress an increase in the dead time.

The flow of the processing in the command generator 21A is the same as the flow of the processing of step S11 shown in FIG. 5. The flow of the processing in the controller 17 is the same as the flow of the processing of steps S12 to S15 shown in FIG. 5. Therefore, no further detailed description will be made thereon.

Meanwhile, the method for controlling the power converting apparatus relating to the present embodiment may include, e.g., a command generating process and a signal generating process, and correspond to the processing follow of the controller 17 and/or its elements as described above. Specifically, the flow of the processing in the controller 17 may be an example or an element of the command generating process, and the flow of the processing in the command generator 21A may be an example or an element of the signal generating process.

Further, each of the command generator 21A and the PWM signal generator 22 may also be examples of elements of the control device relating to the present embodiment, and, similarly to the controller 20, include a microcomputer and various kinds of circuits. The CPU of the microcomputer realizes control of the command generator 21A and the PWM signal generator 22 by reading out and executing a program stored in the ROM. One or all of the command generator 21A and the PWM signal generator 22 may be configured by the hardware such as an ASIC, an FPGA or the like.

[3. Third Embodiment]

Next, description will be made on a power converting apparatus relating to a third embodiment. The power converting apparatus relating to the third embodiment differs from the power converting apparatus 1 relating to the first embodiment in that the power converting apparatus of the third embodiment converts a DC voltage to a three-phase AC voltage and outputs the three-phase AC voltage. In the following description, the constituent elements having the same functions as those of the power converting apparatuses 1 and 1A will be designated by like reference symbols. No duplicate description will be made thereon.

Figure 8:
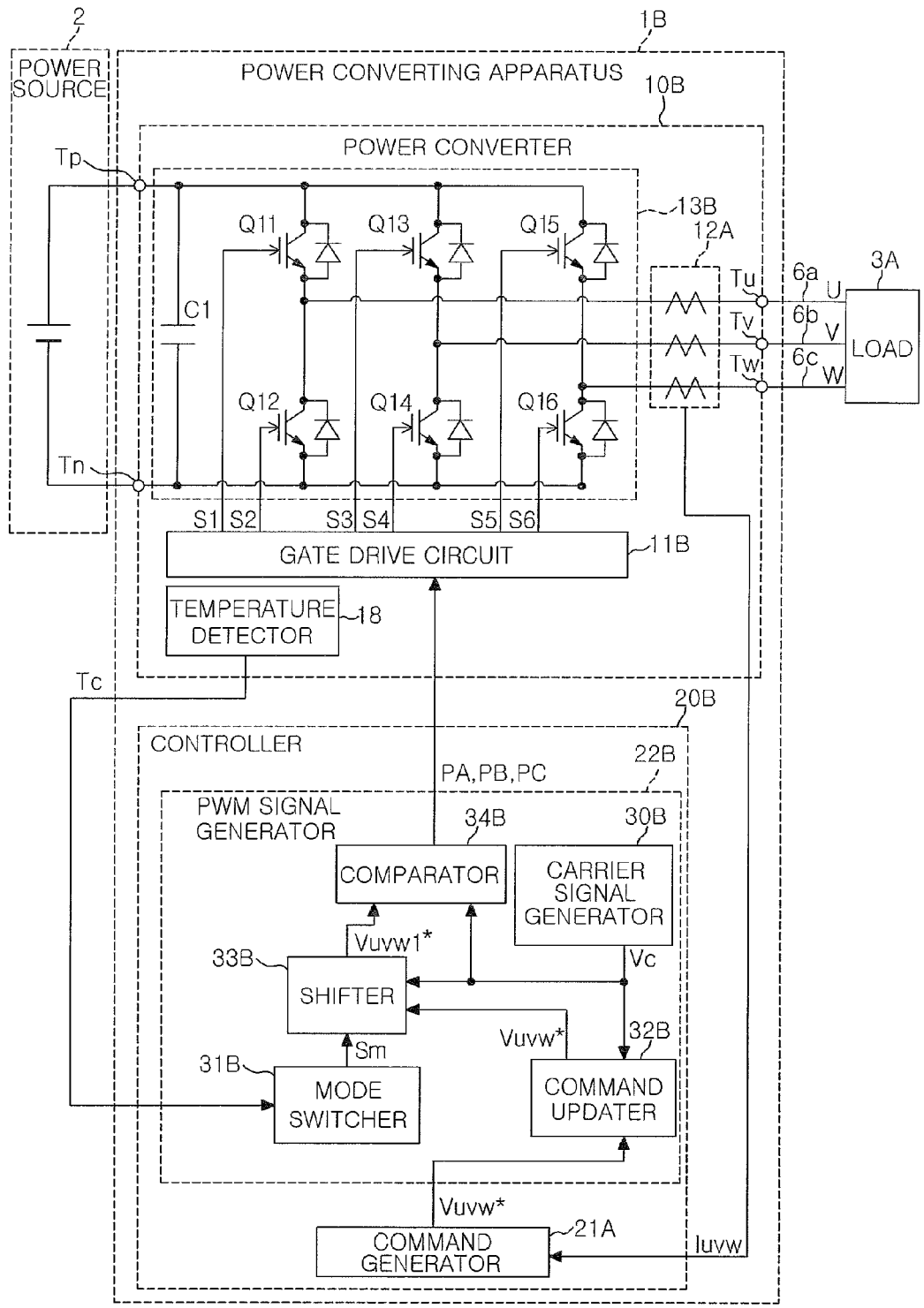
FIG. 8 is a view showing a configuration example of a power converting apparatus relating to a third embodiment.

FIG. 8 is a view showing a configuration example of a power converting apparatus 1B relating to the third embodiment. The power converting apparatus 1B includes a power converter 10B and a controller 20B and outputs a three-phase AC current to a load 3A. Configuration examples of the power converter 10B and the controller 20B will now be described in detail.

[3.1. Power Converter 10B]

As shown in FIG. 8, the power converter 10B includes input terminals Tp and Tn, output terminals Tu, Tv, and Tw, a three-phase two-level inverter circuit 13B, a gate drive circuit 11B, a current detector 12A and a temperature detector 18. The output terminals Tu, Tv, and Tw are respectively connected to the U-phase, V-phase, and W-phase terminals of the load 3A.

The three-phase two-level inverter circuit 13B includes switching elements Q11 to Q16 and a capacitor C1. The switching elements Q11 to Q16 are bridge-connected to one another and are connected to the load 3A through the output terminals Tu, Tv, and Tw. A protective rectifying element is parallel-connected to each of the switching elements Q11 to Q16. The switching elements Q11 to Q16 may be, e.g., a semiconductor device such as an IGBT, a MOSFET or the like.

The gate drive circuit 11B generates gate signals S1 to S6 based on the PWM signals PA, PB, and PC outputted from the controller 20B. For example, the gate drive circuit 11B outputs the gate signals S1, S3, and S5 obtained by amplifying the PWM signals PA, PB, and PC, to the switching elements Q11, Q13, and Q15. Furthermore, the gate drive circuit 11B outputs the gate signals S2, S4, and S6 obtained by inverting and amplifying the PWM signals PA, PB, and PC, to the switching elements Q12, Q14, and Q16.

Thus, the power converter 10B converts the DC voltage inputted from the power source 2 through the input terminals Tp and Tn to the three-phase AC voltage using the switching operations of the switching elements Q11 to Q16 and outputs the converted three-phase AC voltage fourth member M4 the output terminals Tu, Tv, and Tw to the load 3A through the output lines 6a to 6c.

[3.2. Controller 20B]

As shown in FIG. 8, the controller 20B includes a command generator 21A and a PWM signal generator 22B. The PWM signal generator 22B includes a carrier signal generator 30B, a mode switcher 31B, a command updater 32B, a shifter 33B, and a comparator 34B.

The carrier signal generator 30B outputs a carrier signal Vc. The carrier signal Vc is a triangular wave signal but may be, e.g., a saw-tooth wave signal.

The mode switcher 31B outputs a mode signal Sm to the shifter 33B and switches the first mode and the second mode. For example, if the detection temperature Tc is lower than a predetermined value, the mode switcher 31B outputs a mode signal Sm indicative of the first mode to the shifter 33B. If the detection temperature Tc is equal to or higher than the predetermined value, the mode switcher 31B outputs a mode signal Sm indicative of the second mode to the shifter 33B.

The command updater 32B inputs the carrier signal Vc and the phase voltage command Vuvw*. By using the timings of the peak and the bottom of the carrier signal Vc as the updating timings TR, the command updater 32B updates, every updating timing TR, the phase voltage command Vuvw* outputted to the comparator 34B. Thus, the command updater 32B can output the phase voltage command Vuvw* generated by the command generator 21A after the updating timing TR to the comparator 34B at the next updating timing TR.

If the mode signal Sm indicative of the first mode is outputted from the mode switcher 31B, the shifter 33B directly outputs the phase voltage command Vuvw* acquired from the command updater 32B, as a phase voltage command Vuvw1*, without shifting the phase voltage command Vuvw*. The phase voltage command Vuvw1* includes phase voltage commands Vu1*, Vv1*, and Vw1* which are U-phase, V-phase, and W-phase voltage commands.

On the other hand, if the mode signal Sm indicative of the second mode is outputted from the mode switcher 31B, the shifter 33B shifts the phase voltage command Vuvw*, based on the phase voltage command Vuvw* updated by the command updater 32B and the carrier signal Vc, and outputs the shifted phase voltage command Vuvw* as a phase voltage command Vuvw1*.

The comparator 34B compares the carrier signal Vc with the phase voltage commands Vu1*, Vv1*, and Vw1* and generates PWM signals PA, PB, and PC based on a result of the comparison.

For example, if the voltage value of the carrier signal Vc is equal to or larger than the voltage value of the phase voltage command Vu1*, the comparator 34B outputs a PWM signal PA having a low level. If the voltage value of the carrier signal Vc is smaller than the voltage value of the phase voltage command Vu1*, the comparator 34B outputs a PWM signal PA having a high level.

Similarly, if the voltage value of the carrier signal Vc is equal to or larger than the voltage value of the phase voltage command Vv1*, the comparator 34B outputs a PWM signal PB having a low level. If the voltage value of the carrier signal Vc is smaller than the voltage value of the phase voltage command Vv1*, the comparator 34B outputs a PWM signal PB having a high level.

Moreover, if the voltage value of the carrier signal Vc is equal to or larger than the voltage value of the phase voltage command Vw1*, the comparator 34B outputs a PWM signal PC having a low level. If the voltage value of the carrier signal Vc is smaller than the voltage value of the phase voltage command Vw1*, the comparator 34B outputs a PWM signal PC having a high level.

The comparator 34B outputs the generated PWM signals PA, PB, and PC to the gate drive circuit 11B.

Figure 9A:
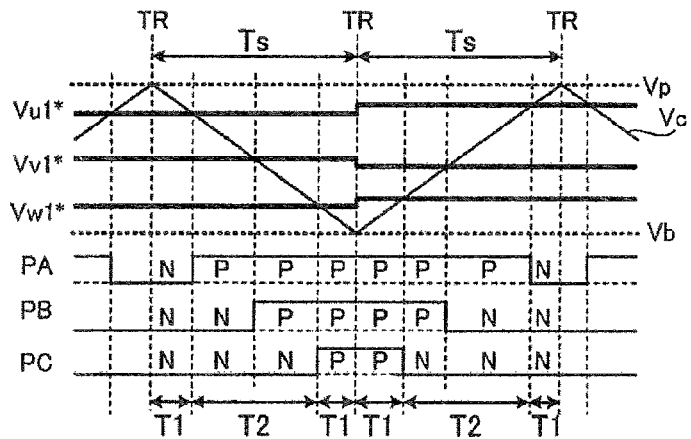
FIG. 9A is an explanatory view of a first mode.

The relationship between the carrier signal Vc, the phase voltage command Vuvw* and the phase voltage command Vuvw1* will now be described in detail with reference to FIGS. 9A to 9C. FIG. 9A is an explanatory view of the first mode.

As shown in FIG. 9A, in case of the first mode, the comparator 34B of the PWM signal generator 22B compares the phase voltage commands Vu1*, Vv1*, and Vw1* having the same values as the phase voltage commands Vu*, Vv*, and Vw* with the carrier signal Vc and generates the PWM signals PA, PB, and PC. Thus, every updating cycle Ts of the phase voltage command Vuvw*, the PWM signal generator 22B repeatedly outputs a PWM signal having a control pattern in which the PWM signal migrates in the order of a first period T1, a second period T2, and a first period T1.

Figure 9B:
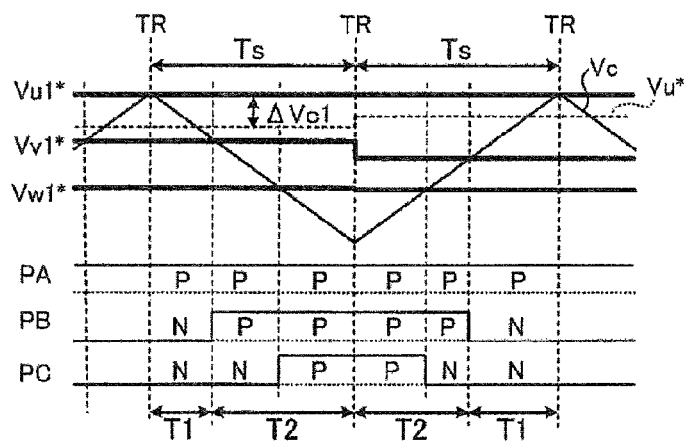
FIG. 9B is an explanatory view showing one example of the first mode.

FIG. 9B is an explanatory view showing one example of the second mode. The shifter relating to the present embodiment is allowed to shift the phase voltage commands such that the greatest one among the phase voltage commands becomes the peak value of the carrier signal or such that the smallest one among the phase voltage commands becomes the bottom value of the carrier signal.

For instance, if the mode signal Sm indicates the second mode, the shifter 33B of the PWM signal generator 22B finds, as shown in FIG. 9B, a difference $\Delta Vc1$ between the largest phase voltage command among the phase voltage commands Vu*, Vv*, and Vw* and the peak value Vp (see FIG. 9A) of the carrier signal Vc.

The shifter 33B generates phase voltage commands Vu1*, Vv1*, and Vw1* by adding the difference $\Delta Vc1$ to the phase voltage commands Vu*, Vv*, and Vw*. The comparator 34B compares the phase voltage commands Vu1*, Vv1*, and Vw1* with the carrier signal Vc and outputs the comparison results as PWM signals PA, PB, and PC.

Figure 9C:
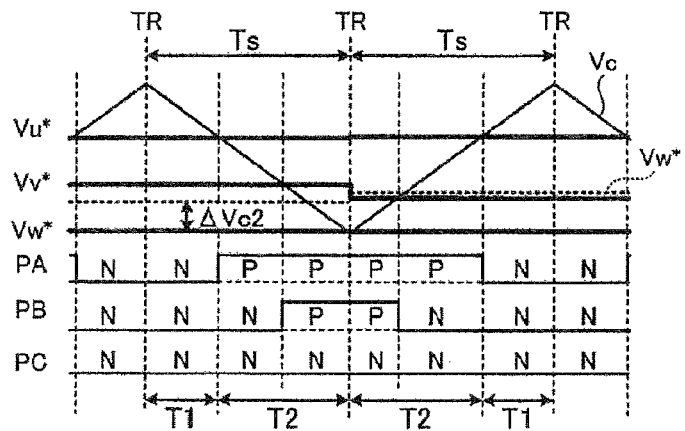
FIG. 9C is an explanatory view showing another example of the first mode.

FIG. 9C is an explanatory view showing another example of the second mode. As shown in FIG. 9C, if the mode signal Sm indicates the second mode, the shifter 33B of the PWM signal generator 22B finds a difference $\Delta Vc2$ between the smallest phase voltage command among the phase voltage commands Vu*, Vv*, and Vw* and the bottom value Vb (see FIG. 9A) of the carrier signal Vc.

The shifter 33B generates phase voltage commands Vu1*, Vv1*, and Vw1* by subtracting the difference $\Delta Vc2$ from the phase voltage commands Vu*, Vv*, and Vw*. The comparator 34B compares the phase voltage commands Vu1*, Vv1*, and Vw1* with the carrier signal Vc and outputs the comparison results as PWM signals PA, PB, and PC.

As described above, the PWM signal generator 22B relating to the third embodiment relatively shifts the phase voltage commands Vu*, Vv*, and Vw* with respect to the carrier signal Vc, based on the peak value Vp or the bottom value Vb of the carrier signal Vc, and compares the shifted phase voltage commands Vu*, Vv*, and Vw* with the carrier signal Vc.

Thus, in the second mode, every updating cycle Ts of the phase voltage command Vuvw*, the PWM signal generator 22B can alternately output a PWM signal having a control pattern in which the PWM signal migrates in the order of a first period T1 and a second period T2 during one updating cycle Ts and a PWM signal having a control pattern in which the PWM signal migrates in the order of a second period T2 and a first period T1 during one updating cycle Ts.

For that reason, in the second mode, the PWM signal generator 22B can make the number of turn-on times of a PWM pulse, namely the number of switching times, equal to two thirds of that available in the first mode. This makes it possible to reduce a switching loss generated in the power converter 10B. Furthermore, the PWM signal generator 22B does not change the updating cycle Ts of the phase voltage command Vuvw* in any of the first and second modes. It is therefore possible to suppress an increase in the dead time required until the phase voltage commands Vu*, Vv*, and Vw* as U-phase, V-phase, and W-phase output voltages are outputted to the load 3A. Therefore, as compared with a case where the dead time is allowed to become longer, it is possible to increase the gain of the current controller 24A and to perform current control with high responsiveness.

Furthermore, if the mode signal Sm indicates the second mode, the shifter 33B of the PWM signal generator 22B may alternately switch the processing shown in FIG. 9B and the processing shown in FIG. 9C, for example, each time when the power converting apparatus 1B is started up.

The flow of the processing in the controller 20B is the same as the flow of the processing shown in FIG. 5. Therefore, no further detailed description will be made thereon.

Meanwhile, the method for controlling the power converting apparatus relating to the present embodiment may include, e.g., a command generating process and a signal generating process, and correspond to the processing follow of the controller 20B and/or its elements as described above. Specifically, the processing flow at step S11 as shown in FIG. 5 may be an example or an element of the command generating process, and the processing follow at steps S12 to S15 as shown in FIG. 5 may be an example or an element of the signal generating process.

Further, the controller 20B may also be an example of the control device relating to the present embodiment, and, similarly to the controller 20, include a microcomputer and various kinds of circuits. The CPU of the microcomputer realizes control of the command generator 21A and the PWM signal generator 22B by reading out and executing a program stored in the ROM. One or all of the command generator 21A and the PWM signal generator 22B may be configured by the hardware such as an ASIC, an FPGA or the like.

[4. Fourth Embodiment]

Next, description will be made on a power converting apparatus relating to a fourth embodiment. The power converting apparatus relating to the fourth embodiment differs from the power converting apparatus 1B relating to the third embodiment in that the power converting apparatus of the fourth embodiment converts a three-level DC voltage to a three-phase AC voltage. In the following description, the constituent elements having the same functions as those of the power converting apparatus 1B will be designated by like reference symbols. No duplicate description will be made thereon.

Figure 10:
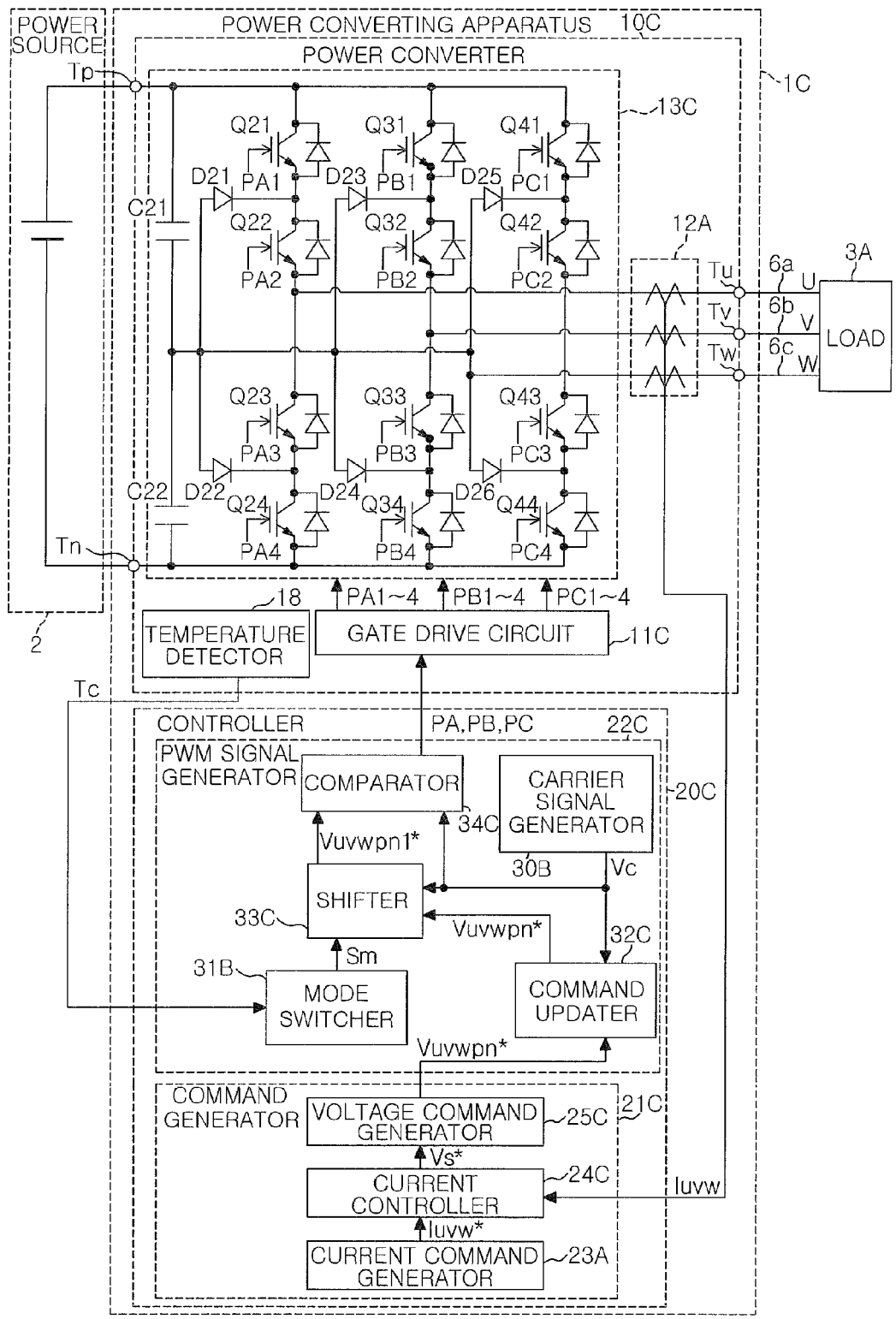
FIG. 10 is a view showing a configuration example of a power converting apparatus relating to a fourth embodiment.

FIG. 10 is a view showing a configuration example of a power converting apparatus 1C relating to the fourth embodiment. The power converting apparatus 1C includes a power converter 10C and a controller 20C and outputs a three-phase AC current to a load 3A. Configuration examples of the power converter 10C and the controller 20C will now be described in detail.

[4.1. Power Converter 10C]

The power converter relating to the present embodiment may be configured as a multilevel output. That is, the power converter may be configured to output the voltage at multiple levels. As shown in FIG. 10, the power converter 10C includes input terminals Tp and Tn, output terminals Tu, Tv, and Tw, a multilevel inverter circuit(e.g., a three-phase three-level inverter circuit 13C), a gate drive circuit 11C, a current detector 12A and a temperature detector 18.

The three-phase three-level inverter circuit 13C includes switching elements Q21 to Q24, Q31 to Q34, and Q41 to Q44, capacitors C21 and C22, and diodes D21 to D26. The three-phase three-level inverter circuit 13C is connected to the load 3A through the output terminals Tu, Tv, and Tw. A protective rectifying element is parallel-connected to each of the switching elements Q21 to Q24, Q31 to Q34, and Q41 to Q44. The switching elements Q21 to Q24, Q31 to Q34, and Q41 to Q44 may be, e.g., a semiconductor device such as an IGBT, a MOSFET or the like.

The gate drive circuit 11C generates gate signals PA1 to PA4, PB1 to PB4, and PC1 to PC4 based on the PWM signals PA, PB, and PC outputted from the controller 20C. Description will now be made on an example in which the gate drive circuit 11C generates the gate signals PA1 to PA4 using the PWM signal PA.

For example, if the PWM signal PA is of a high level, the gate drive circuit 11C keeps the gate signals PA1 and PA2 at a high level and keeps the gate signals PA3 and PA4 at a high level. Thus, the three-phase three-level inverter circuit 13C outputs a DC voltage (hereinafter referred to as "power source voltage Vdc") of the power source 2 from the U-phase output terminal Tu.

For example, if the PWM signal PA is of a low level, the gate drive circuit 11C keeps the gate signals PA3 and PA4 at a high level and keeps the gate signals PA1 and PA2 at a low level. Thus, the three-phase three-level inverter circuit 13C outputs a zero potential (ground potential) from the U-phase output terminal Tu.

For example, if the PWM signal PA is of a middle level, the gate drive circuit 11C keeps the gate signals PA2 and PA3 at a high level and keeps the gate signals PA1 and PA4 at a low level. Thus, the three-phase three-level inverter circuit 13C outputs a voltage (Vdc/2) equal to one half of the power source voltage Vdc from the U-phase output terminal Tu.

With respect to the PWM signals PB and PC, just like the PWM signal PA, the gate drive circuit 11C generates gate signals PB1 to PB4 and PC1 to PC4. In this way, the power converter 10C converts the DC voltage inputted from the power source 2 through the input terminals Tp and Tn to the three-phase AC voltage using the switching operations of the switching elements Q21 to Q24, Q31 to Q34, and Q41 to Q44 and outputs the three-phase AC voltage from the output terminals Tu, Tv, and Tw to the load 3A through the output lines 6a to 6c.

[4.2. Controller 20C]

As shown in FIG. 10, the controller 20C includes a command generator 21C and a PWM signal generator 22C. The command generator 21C includes a current command generator 23A, a current controller 24C, and a voltage command generator 25C.

The current controller 24C generates a voltage command vector Vs* such that a deviation between the phase current command Iuvw* and the output phase current Iuvw becomes zero. The voltage command generator 25C generates and outputs a phase voltage command Vuvwpn from the voltage command vector Vs*. The phase voltage command relating to the present embodiment may include first phase voltage command and second phase voltage command with respect to each phase. Accordingly, in a case of a multiphase AC voltage, a plurality of first phase voltage commands and a plurality of second phase voltage commands may exist. For instance, the phase voltage command Vuvwpn* includes first phase voltage commands Vup*, Vvp*, and Vwp* and second phase voltage commands Vun*, Vvn*, and Vwn* corresponding to the U-phase, the V-phase, and W-phase. The voltage command generator 25C generates the phase voltage command Vuvwpn* from the voltage command vector Vs* using, e.g., well-known dipolar modulation (see, e.g., Japanese Patent Application Publication No. 05-211775).

The PWM signal generator 22C includes a carrier signal generator 30B, a mode switcher 31B, a command updater 32C, a shifter 33C and a comparator 34C.

The command updater 32C inputs the carrier signal Vc and the phase voltage command Vuvwpn*. By using the timings of the peak and the bottom of the carrier signal Vc as the updating timings TR, the command updater 32C updates, every updating timing TR, the phase voltage command Vuvwpn* outputted to the comparator 34C. Thus, the command updater 32C can output the phase voltage command Vuvwpn* generated by the voltage command generator 25C after the updating timing TR to the comparator 34C at the next updating timing TR.

If the mode signal Sm indicative of the first mode is outputted from the mode switcher 31B, the shifter 33C directly outputs the phase voltage command Vuvwpn* acquired from the command updater 32C, as a phase voltage command Vuvwpn1*, without shifting the phase voltage command Vuvwpn*. The phase voltage command Vuvwpn1* includes first phase voltage commands Vup1*, Vvp1*, and Vwp1* and second phase voltage commands Vun1*, Vvn1*, and Vwn1* corresponding to the U-phase, the V-phase, and the W-phase.

On the other hand, if the mode signal Sm indicative of the second mode is outputted from the mode switcher 31B, the shifter 33C shifts the phase voltage command Vuvwpn*, based on the phase voltage command Vuvwpn* updated by the command updater 32C and the carrier signal Vc, and outputs the shifted phase voltage command Vuvwpn* as a phase voltage command Vuvwpn1*.

The comparator 34C compares the carrier signal Vc with the phase voltage commands Vup1*, Vvp1*, Vwp1*, Vun1*, Vvn1*, and Vwn1* and generates PWM signals PA, PB, and PC.

For example, if the voltage value of the carrier signal Vc is equal to or larger than the voltage value of the phase voltage command Vup1*, the comparator 34C outputs a PWM signal PA having a low level. If the voltage value of the carrier signal Vc is between the voltage value of the phase voltage command Vup1* and the voltage value of the phase voltage command Vun1*, the comparator 34C outputs a PWM signal PA having a middle level. If the voltage value of the carrier signal Vc is smaller than the voltage value of the phase voltage command Vun1*, the comparator 34C outputs a PWM signal PA having a high level.

Similarly, if the voltage value of the carrier signal Vc is equal to or larger than the voltage value of the phase voltage command Vvp1*, the comparator 34C outputs a PWM signal PB having a low level. If the voltage value of the carrier signal Vc is between the voltage value of the phase voltage command Vvp1* and the voltage value of the phase voltage command Vvn1*, the comparator 34C outputs a PWM signal PB having a middle level. If the voltage value of the carrier signal Vc is smaller than the voltage value of the phase voltage command Vvn1*, the comparator 34C outputs a PWM signal PB having a high level.

Moreover, if the voltage value of the carrier signal Vc is equal to or larger than the voltage value of the phase voltage command Vwp1*, the comparator 34C outputs a PWM signal PC having a low level. If the voltage value of the carrier signal Vc is between the voltage value of the phase voltage command Vwp1* and the voltage value of the phase voltage command Vwn1*, the comparator 34C outputs a PWM signal PC having a middle level. If the voltage value of the carrier signal Vc is smaller than the voltage value of the phase voltage command Vwn1*, the comparator 34C outputs a PWM signal PC having a high level.

The comparator 34C outputs the generated PWM signals PA, PB, and PC to the gate drive circuit 11C.

Figure 11A:
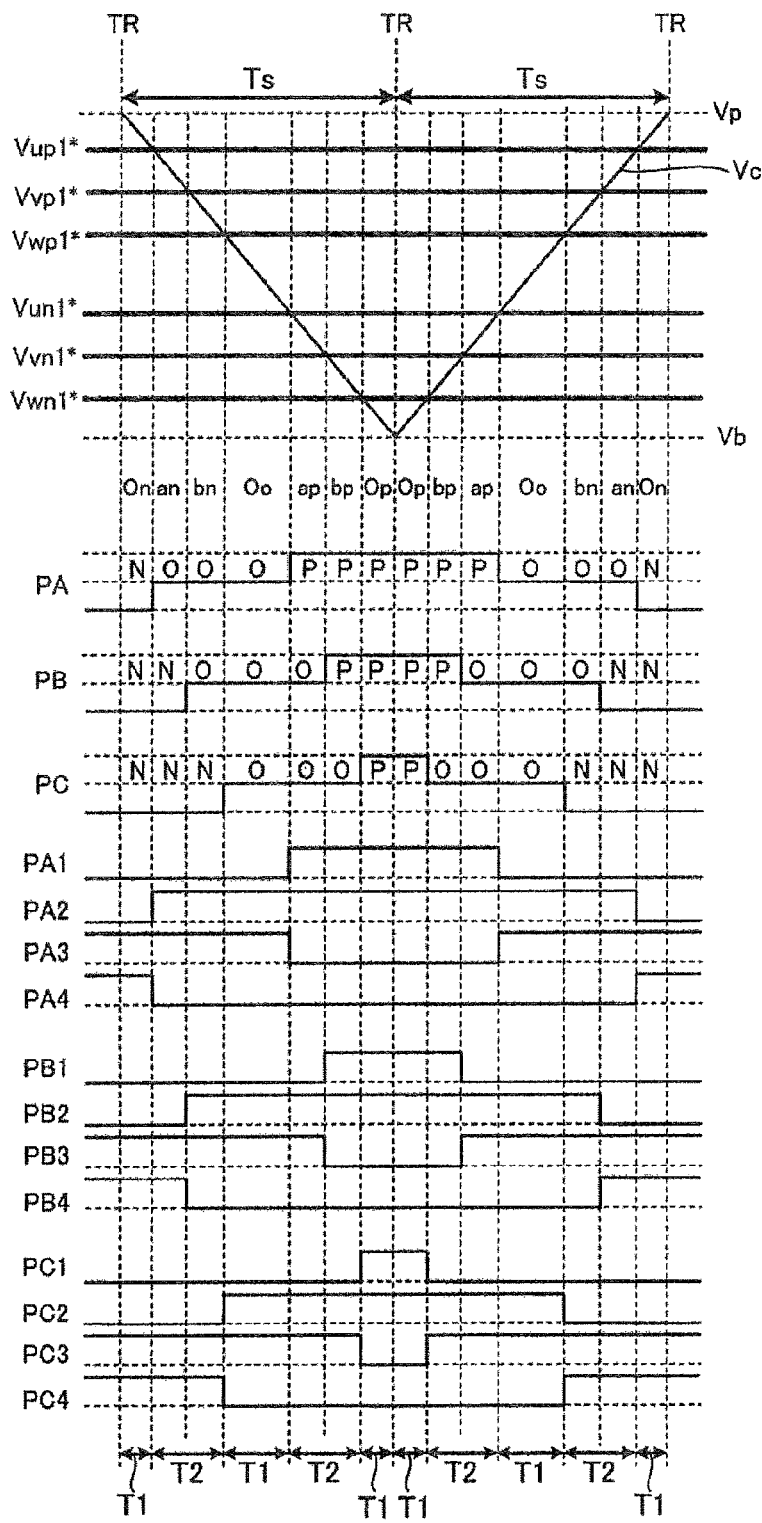
FIG. 11A is an explanatory view of a first mode.

The relationship between the carrier signal Vc, the phase voltage command Vuvwpn* and the phase voltage command Vuvwpn1* will now be described in detail with reference to FIGS. 11A and 11B. FIG. 11A is an explanatory view of the first mode.

As shown in FIG. 11A, in case of the first mode, the comparator 34C of the PWM signal generator 22C compares the phase voltage commands Vup1*, Vvp1*, Vwp1*, Vun1*, Vvn1*, and Vwn1* having the same values as the phase voltage commands Vup*, Vvp*, Vwp*, Vun*, Vvn*, and Vwn* with the carrier signal Vc and generates the PWM signals PA, PB, and PC.

Thus, for each (and preferably, every) updating cycle Ts of the phase voltage command Vuvwpn*, the PWM signal generator 22C repeatedly outputs a PWM signal having a control pattern which is set to sequentially cause a first period T1, a second period T2, a first period T1, a second period T2, and a first period T1 in that order.

Figure 11B:
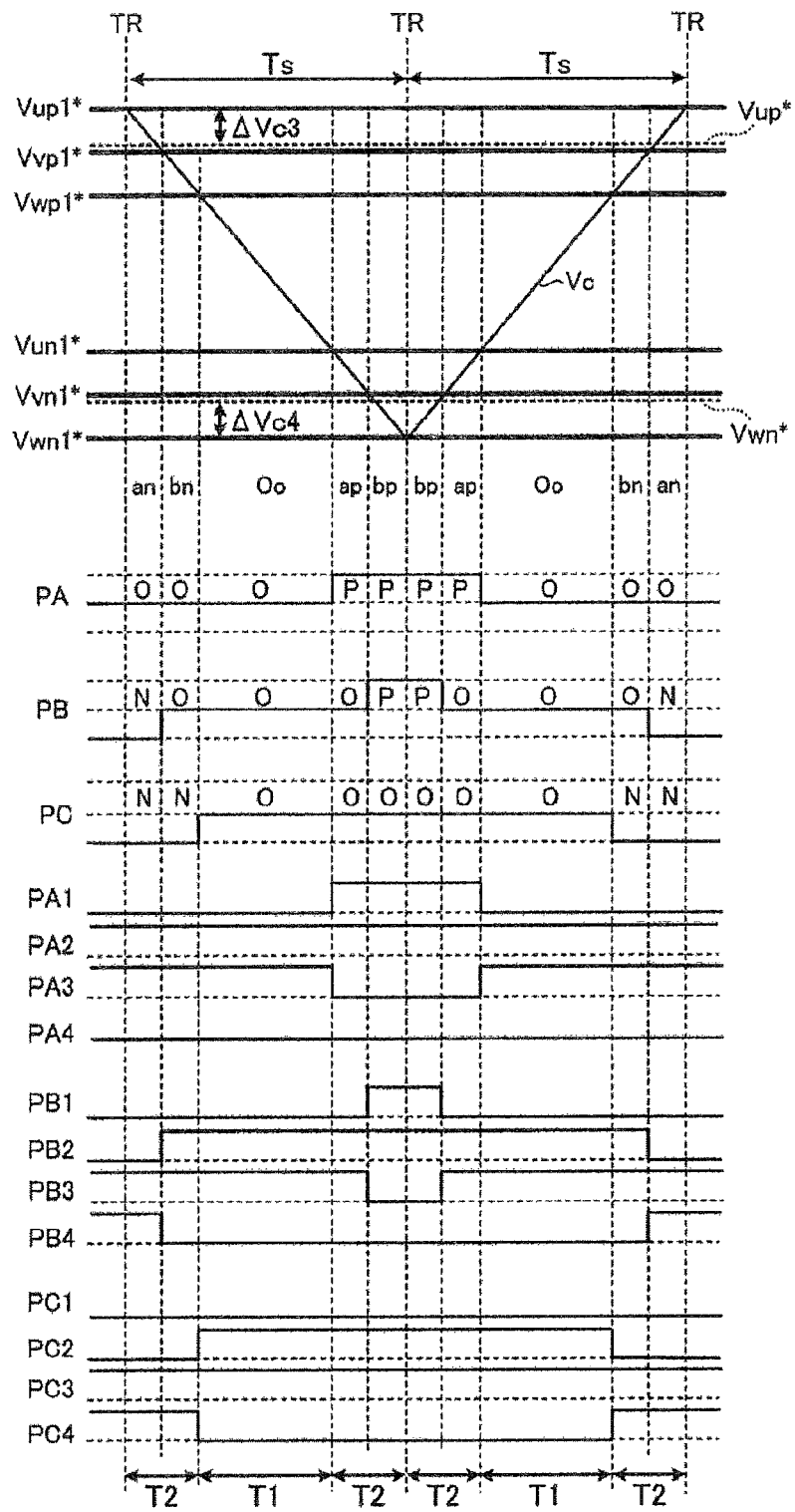
FIG. 11B is an explanatory view of the first mode.

FIG. 11B is an explanatory view showing one example of the second mode. The shifter of the PWM signal generator relating to the present embodiment shifts the first phase voltage commands such that the greatest one among the first phase voltage commands becomes the peak value of the carrier signal and shift the second phase voltage commands such that the smallest one among the second phase voltage commands becomes the bottom value of the carrier signal.

Specifically, as shown in FIG. 11B, the shifter 33C of the PWM signal generator 22C finds a difference ΔVc3 between the largest phase voltage command among the phase voltage commands Vup1*, Vvp1*, and Vwp1* and the peak value Vp (see FIG. 11A) of the carrier signal Vc. The shifter 33C generates phase voltage commands Vup1*, Vvp1*, and Vwp1* by adding the difference ΔVc3 to the phase voltage commands Vup*, Vvp*, and Vwp*.

Furthermore, the shifter 33C finds a difference ΔVc4 between the smallest phase voltage command among the phase voltage commands Vun*, Vvn*, and Vwn* and the bottom value Vb (see FIG. 11A) of the carrier signal Vc. The shifter 33C generates phase voltage commands Vun1*, Vvn1*, and Vwn1* by subtracting the difference ΔVc4 from the phase voltage commands Vun*, Vvn*, and Vwn*.

The comparator 34C compares the phase voltage commands Vup1*, Vvp1*, Vwp1*, Vun1*, Vvn1*, and Vwn1* with the carrier signal Vc and outputs the comparison results as PWM signals PA, PB, and PC. Thus, for each (and preferably, every) updating cycle Ts of the phase voltage command Vuvwpn*, the PWM signal generator 22C is allowed to repeatedly output a PWM signal having a control pattern which is set to sequentially cause a second period T2, a first period T1, and a second period T2 in that order.

As described above, the PWM signal generator 22C relating to the fourth embodiment relatively shifts the phase voltage commands Vup*, Vvp*, Vwp*, Vun*, Vvn*, and Vwn* with respect to the carrier signal Vc, based on the peak value Vp or the bottom value Vb of the carrier signal Vc, and compares the shifted phase voltage commands Vup*, Vvp*, Vwp*, Vun*, Vvn*, and Vwn* with the carrier signal Vc.

Thus, in the second mode, the PWM signal generator 22C can make the number of turn-on times of a PWM pulse, namely the number of switching times, equal to two thirds of that available in the first mode. This makes it possible to reduce a switching loss generated in the power converter 10C. Furthermore, the PWM signal generator 22C does not change the updating cycle Ts of the phase voltage command Vuvwpn* in any of the first and second modes. It is therefore possible to suppress an increase in the dead time required until the phase voltage commands Vuvw* as U-phase, V-phase, and W-phase output voltages are outputted to the load 3A. Therefore, as compared with a case where the dead time is allowed to become longer, it is possible to increase the gain of the current controller 24A and to perform current control with high responsiveness.

The flow of the processing in the controller 20C is the same as the flow of the processing shown in FIG. 5. Therefore, no further detailed description will be made thereon.

Meanwhile, the method for controlling the power converting apparatus relating to the present embodiment may include, e.g., a command generating process and a signal generating process, and correspond to the processing follow of the controller 20C and/or its elements as described above. Specifically, the processing flow at step S11 as shown in FIG. 5 may be an example or an element of the command generating process, and the processing follow at steps S12 to S15 as shown in FIG. 5 may be an example or an element of the signal generating process.

Further, the controller 20C may also be an example of the control device relating to the present embodiment, and, similarly to the controller 20, include a microcomputer and various kinds of circuits. The CPU of the microcomputer realizes control of the command generator 21C and the PWM signal generator 22C by reading out and executing a program stored in the ROM. One or all of the command generator 21C and the PWM signal generator 22C may be configured by the hardware such as an ASIC, an FPGA or the like.

Figure 12:
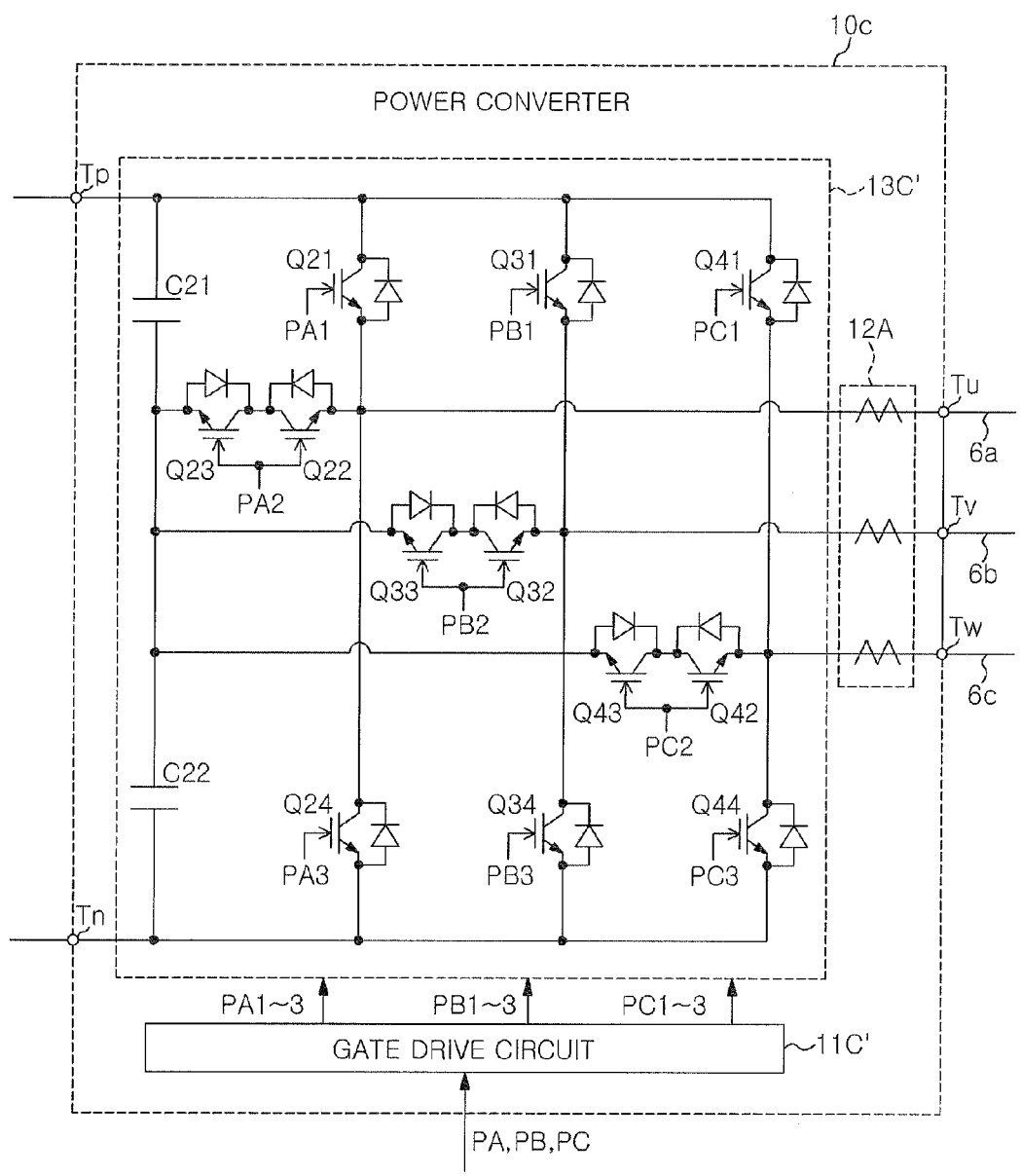
FIG. 12 is a view showing a configuration example of another power convertor relating to the fourth embodiment.

The power converter 10C is not limited to the examples shown in FIG. 10. FIG. 12 is a view showing a configuration example of another power converter 10C relating to the fourth embodiment. The power converter 10C shown in FIG. 12 is configured as a multilevel output, and specifically, includes a gate drive circuit 11C', a current detector 12A, and a multilevel inverter circuit(e.g., a three-phase three-level inverter circuit 13C').

As shown in FIG. 12, the three-phase three-level inverter circuit 13C' includes switching elements Q21 to Q24, Q31 to Q34, and Q41 to Q44 and capacitors C21 and C22. A protective rectifying element is parallel-connected to each of the switching elements Q21 to Q24, Q31 to Q34, and Q41 to Q44.

The gate drive circuit 11C' generates gate signals PA1 to PA3, PB1 to PB3, and PC1 to PC3 based on the PWM signals PA, PB, and PC outputted from the controller 20C. Description will now be made on an example in which the gate drive circuit 11C' generates the gate signals PA1 to PA3 using the PWM signal PA.

For example, if the PWM signal PA is of a high level, the gate drive circuit 11C' keeps the gate signal RA1 at a high level and keeps the gate signals PA2 and PA3 at a low level. Thus, the three-phase three-level inverter circuit 13C' outputs a power source voltage Vdc from the U-phase output terminal Tu.

For example, if the PWM signal PA is of a low level, the gate drive circuit 11C' keeps the gate signal PA3 at a high level and keeps the gate signals PA1 and PA2 at a low level. Thus, the three-phase three-level inverter circuit 13C' outputs a zero potential from the U-phase output terminal Tu.

For example, if the PWM signal PA is of a middle level, the gate drive circuit 11C' keeps the gate signal PA3 at a high level and keeps the gate signals PA1 and PA3 at a low level.

Thus, the three-phase three-level inverter circuit 13C' outputs a voltage (Vdc/2) equal to one half of the power source voltage Vdc from the U-phase output terminal Tu.

With respect to the PWM signals PB and PC, just like the PWM signal PA, the gate drive circuit 11C' generates gate signals PB1 to PB3 and PC1 to PC3. In this way, the power converter 10C converts the DC voltage inputted from the power source 2 through the input terminals Tp and Tn to the three-phase AC voltage using the switching operations of the switching elements Q21 to Q24, Q31 to Q34, and Q41 to Q44 and outputs the three-phase AC voltage from the output terminals Tu, Tv, and Tw to the load 3A through the output lines 6a to 6c.

[Fifth Embodiment]

Next, description will be made on a power converting apparatus relating to a fifth embodiment. The power converting apparatus relating to the fifth embodiment differs from the power converting apparatus 1B relating to the third embodiment in that the power converting apparatus of the fifth embodiment generates a PWM signal using a space vector method. In the following description, the constituent elements having the same functions as those of the power converting apparatus 1B will be designated by like reference symbols. No duplicate description will be made thereon.

Figure 13:
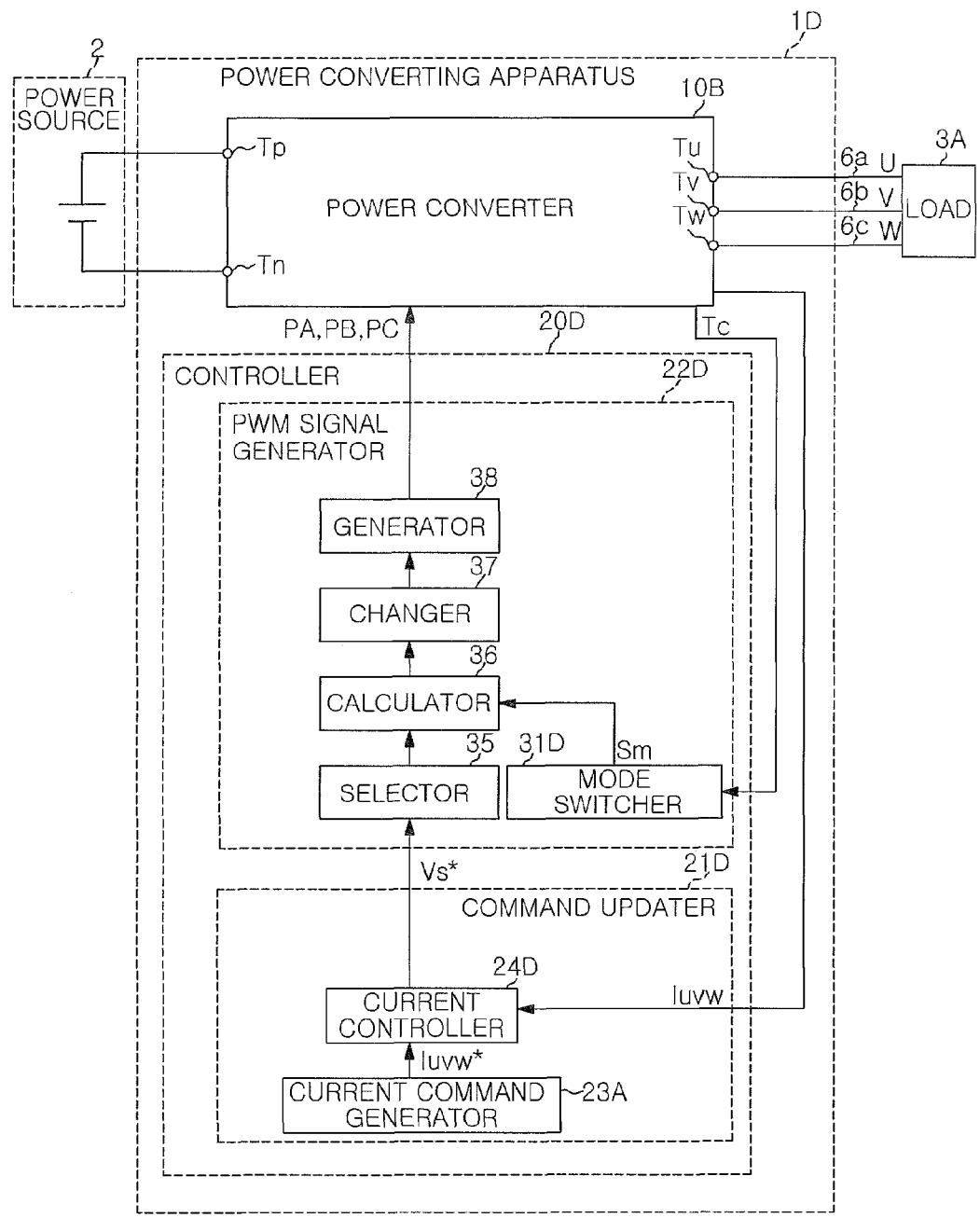
FIG. 13 is a view showing a configuration example of a power converting apparatus relating to a fifth embodiment.

FIG. 13 is a view showing a configuration example of a power converting apparatus 1D relating to the fifth embodiment. The power converting apparatus 1D includes a power converter 10B and a controller 20D and outputs a three-phase AC current to a load 3A. A configuration example of the controller 20D will now be described in detail.

As shown in FIG. 13, the controller 20D includes a command generator 21D and a PWM signal generator 22D. The command generator 21D includes a current command generator 23A and a current controller 24D. The current controller 24D generates a voltage command vector Vs* (one example of a voltage command) such that a deviation between the phase current command Iuvw* and the output phase current Iuvw becomes zero.

The PWM signal generator 22D includes a mode switcher 31D, a selector 35, a calculator 36, a changer 37, and a generator 38.

The mode switcher 31D outputs a mode signal Sm to the calculator 36 and switches a first mode and a second mode. For example, if a detection temperature Tc is loser than a predetermined value, the mode switcher 31D outputs a mode signal Sm indicative of the first mode to the calculator 36. If the detection temperature Tc is equal to or higher than the predetermined value, the mode switcher 31D outputs a mode signal Sm indicative of the second mode to the calculator 36.

Figure 14:
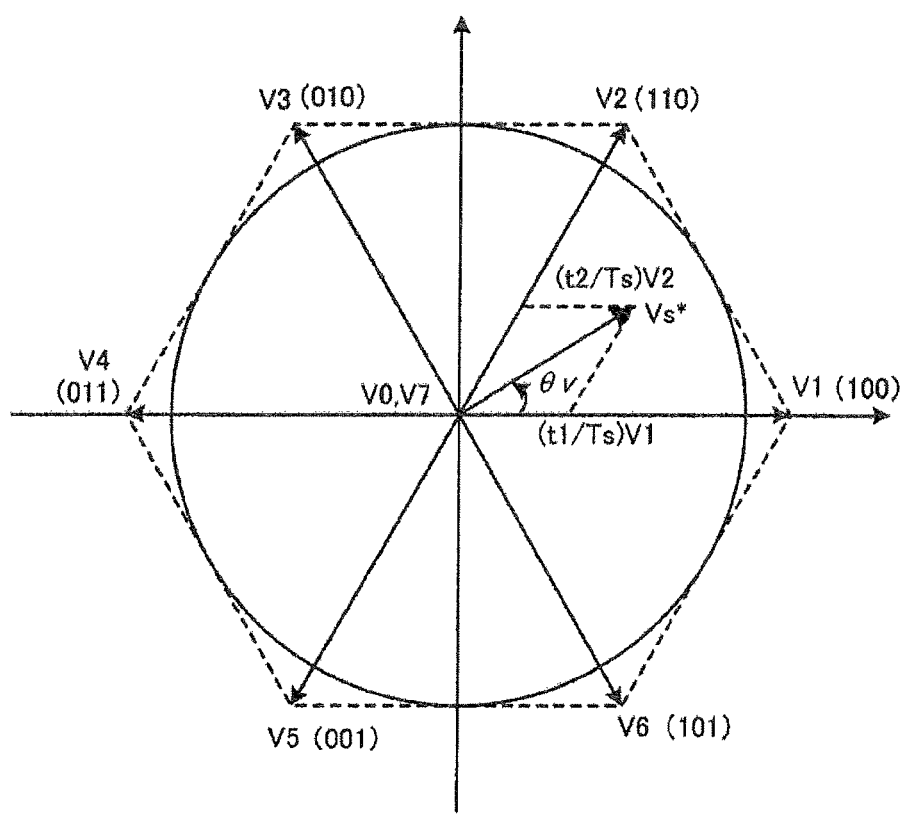
FIG. 14 is an explanatory view of a space vector.

Based on the voltage command vector Vs*, for each (and preferably, every) updating cycle Ts, the selector 35 selects a combination of two or more (e.g. two) zero voltage vectors and one or more (e.g., two) non-zero voltage vectors from a plurality of voltage vectors. FIG. 14 is an explanatory view of a space vector method. Θv is a phase angle between the voltage vector V1 and the voltage command vector Vs.

In FIG. 14, there are shown eight voltage vectors including zero voltage vectors V0 and V7 and non-zero voltage vectors V1 to V6. The selector 35 selects, e.g., two non-zero voltage vectors V1 and V2 adjoining the voltage command vector Vs* and zero voltage vectors V0 and V7.

In this case, every updating cycle Ts, the selector 35 alternately switches, for example, a pattern (hereinafter referred to as "first selection pattern") in which the selector 35 selects the voltage vectors in the order of V0, V1, V2 and V7 and a pattern (hereinafter referred to as "second selection pattern") in which the selector 35 selects the voltage vectors in the order of V7, V2, V1, and V0 which is the reverse order of that of the first selection pattern.

In FIG. 14, V1 (100) indicates the state of a U-phase, a V-phase, and a W-phase attributable to the voltage vector V1 and indicates the state in which the switching element Q11 existing above the U-phase is turned on and in which the switching elements Q14 and Q16 existing below the V-phase and the W-phase are turned on.

The calculator 36 (which may also be called "an output period calculator") calculates output periods of the voltage vectors selected by the selector 35. For example, if the selector 35 selects the non-zero voltage vectors V1 and V2, the calculator 36 calculates an output period t1 of the non-zero voltage vector V1 and an output period t2 of the non-zero voltage vector V2 using, e.g., the following formulae (1) and (2):

$$t_1 = \frac{2}{\sqrt{3}} \frac{|V_s^*|}{V_{max}} T_s \cdot \sin\left(\frac{\pi}{3} - \theta_V\right) \quad (1)$$

$$t_2 = \frac{2}{\sqrt{3}} \frac{|V_s^*|}{V_{max}} T_s \cdot \sin \theta_V \quad (2)$$

where $V_{max}$ denotes a maximum value of the voltage command.

The calculator 36 calculates an output period t0 of the zero voltage vector V0 and an output period t7 of the zero voltage vector V7 by dividing a period (=Ts−t1−t2) obtained by subtracting the total sum of the output periods t1 and t2 of the non-zero voltage vectors V1 and V2 from the updating cycle Ts, into two periods.

The calculator 36 outputs the information on the output periods of the voltage vectors to the changer 37 in the order of the voltage vectors selected by the selector 35. For example, if the voltage vectors V0, V1, V2, and V7 are selected by the selector 35 in the first selection pattern, the calculator 36 outputs the information on the output periods in the order of the output periods t0, t1, t2, and t7.

If the mode signal Sm indicative of the first mode is outputted from the mode switcher 31D, the changer 37 outputs the information on the output periods acquired from the calculator 36 as it is. For example, upon acquiring the information on the output periods t0, t1, t2, and t7 from the calculator 36, the changer 37 outputs the information on the output periods t0, t1, t2, and t7 as it is.

On the other hand, if the mode signal Sm indicative of the second mode is outputted from the mode switcher 31D, the changer 37 changes the output periods of two or more zero voltage vectors such that the output periods of two or more zero voltage vectors among the output periods calculated by the calculator 36 are replaced by the output period of one zero voltage vector corresponding to the total sum output period of two or more zero voltage vectors.

For example, upon acquiring the information on the output periods t0, t1, t2, and t7 from the calculator 36, the changer 37 adds up the output periods t0 and t7. The addition result is used as the output period of one of the output periods t0 and t7. The other of the output periods t0 and t7 is made 0. Thus, two zero voltage vectors to be outputted is changed to one.

If the addition result is used as the output period t0, the changer 37 outputs the information on the output periods t0, t1, and t2. If the addition result is used as the output period t7, the changer 37 outputs the information on the output periods t1, t2, and t7.

Based on the information on the output periods outputted from the changer 37, the generator 38 (which may also be called "a generating circuit") generates PWM signals PA, PB, and PC. Specifically, the generator relating to the present embodiment generates the PWM signals which are set such that the output period of one zero voltage vector outputted from the changer is used as one first period and such that the output periods of one or more non-zero voltage vectors outputted from the changer are used as one or more second periods. The generator 38 outputs the generated PWM signals PA, PB, and PC to the power converter 10B (the gate drive circuit 11B).

Figure 15A:
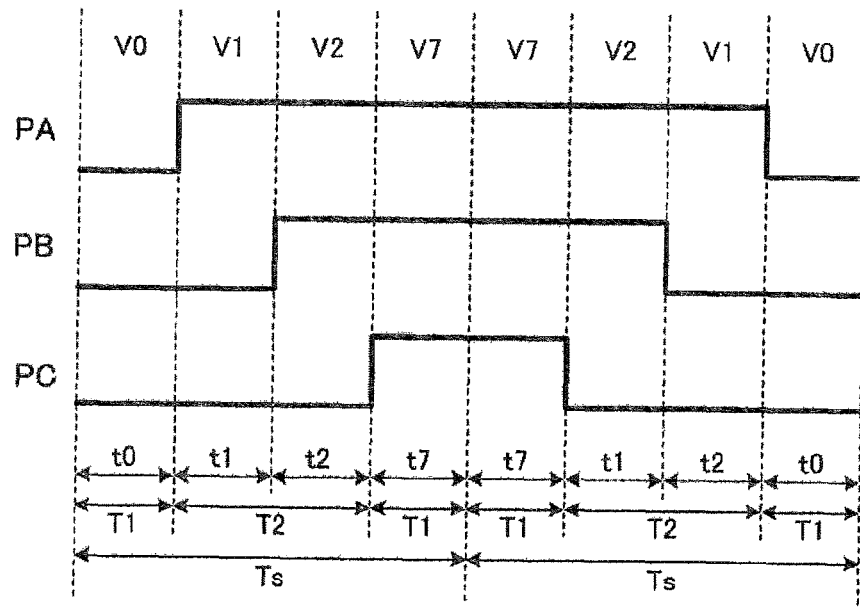
FIG. 15A is a view showing a relationship between a voltage vector, an output period and a PWM signal in a first mode.

For example, upon sequentially acquiring, as the information on the output periods in the first mode, the information on the output periods t0, t1, t2, and t7 and the information on the output periods t7, t2, t1, and t0 from the changer 37, the generator 38 generates PWM signals PA, PB, and PC as shown in FIG. 15A. FIG. 15A is a view showing the relationship between the voltage vectors, the output periods and the PWM signals in the first mode.

Figure 15B:
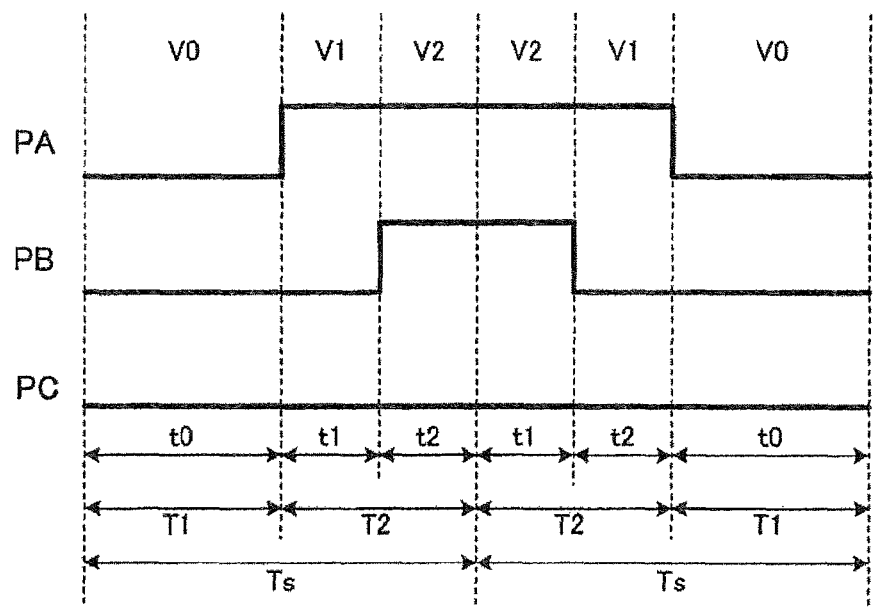
FIG. 15B is a view showing a relationship between a voltage vector, an output period and a PWM signal in a second mode.

Furthermore, upon acquiring, as the information on the output periods in the second mode, the information on the output periods t0, t1, and t2 and the information on the output periods t2, t1, and t0 from the changer 37, the generator 38 generates PWM signals PA, PB, and PC as shown in FIG. 15B. FIG. 15B is a view showing the relationship between the voltage vectors, the output periods and the PWM signals in the second mode.

Figure 15C:
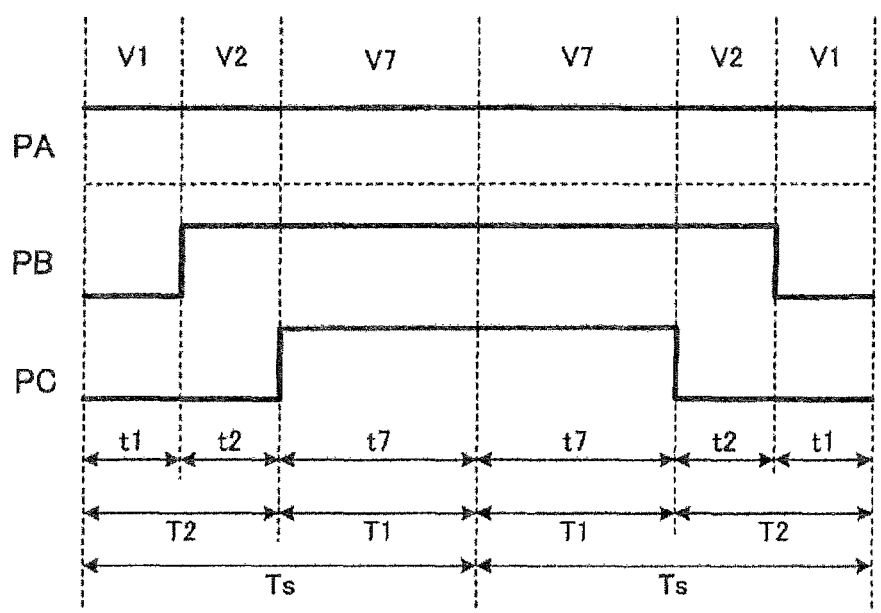
FIG. 15C is a view showing a relationship between a voltage vector, an output period and a PWM signal in the second mode.

Moreover, upon acquiring, as the information on the output periods in the second mode, the information on the output periods t1, t2, and t7 and the information on the output periods t7, t2, and t1 from the changer 37, the generator 38 generates PWM signals PA, PB, and PC as shown in FIG. 15C. FIG. 15C is a view showing the relationship between the voltage vectors, the output periods and the PWM signals in the second mode.

As shown in FIGS. 15B and 15C, in case of the second mode, the generator 38 generates PWM signals PA, PB, and PC in which the output period t0 or the output period t7 changed by the changer 37 is used as a first period T1 and in which the output periods of one or more non-zero voltage vectors (e.g., the output periods of t1 and t2 of the two non-zero voltage vectors V1 and V2 as shown in FIGS. 15B and 15C) are used as two second periods T2.

Thus, in the second mode, just like the power converting apparatus 1B, the power converting apparatus 1D can make the number of turn-on times of a PWM pulse, namely the number of switching times, equal to two thirds of that available in the first mode. This makes it possible to reduce a switching loss while suppressing an increase in the dead time.

In the foregoing description, the order of the voltage command vectors Vs* is set by the selector 35.

Alternatively, the order of the voltage command vectors may be set by the generator 38. In this case, the generator 38 sets the order of the voltage vectors based on, e.g., the voltage command vectors Vs* and the mode signals Sm.

Figure 16:
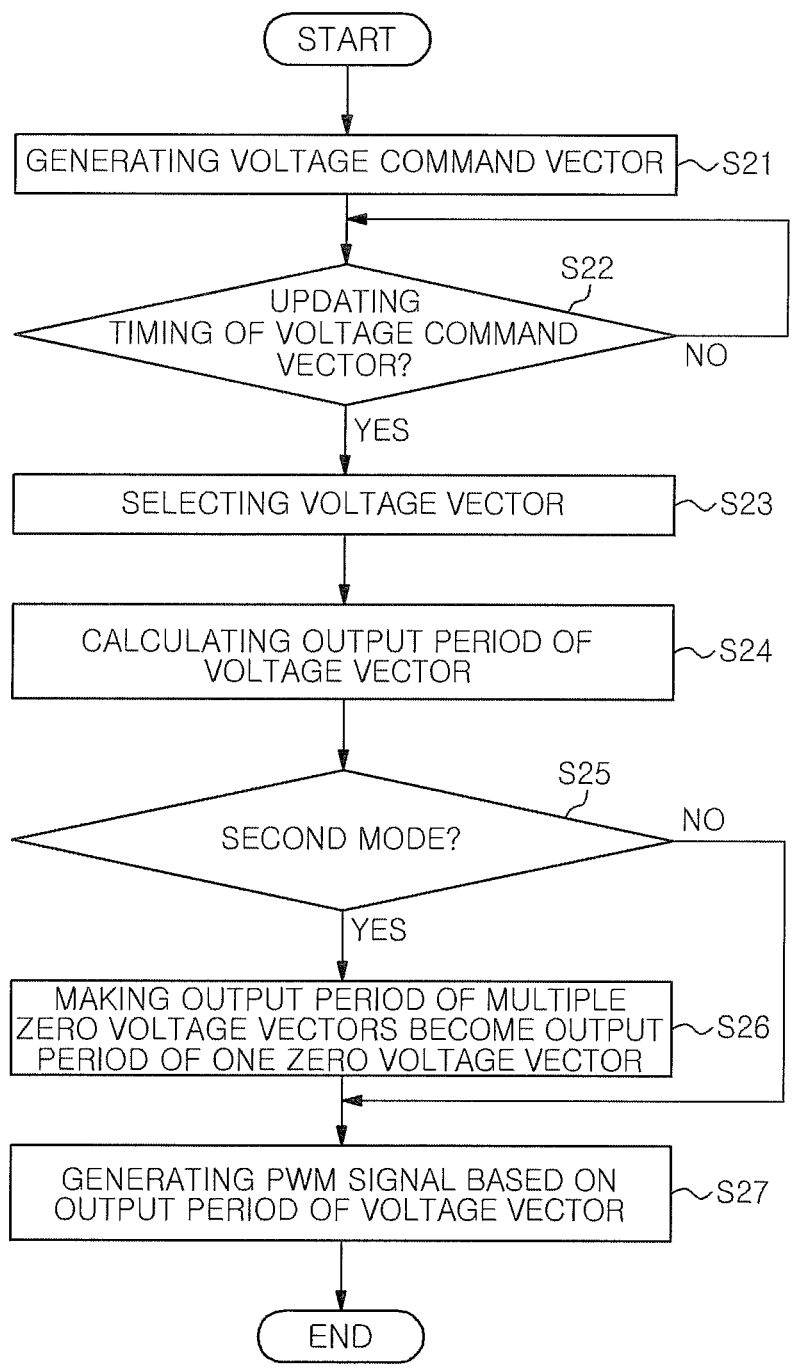
FIG. 16 is a flowchart illustrating one example of a processing flow of a controller shown in FIG. 13.

Now, description will be made on one example of the flow of the processing in the controller 20D. FIG. 16 is a flowchart showing one example of the flow of the processing in the controller 20D.

As shown in FIG. 16, the command generator 21D of the controller 20D generates a voltage command vector Vs* (step S21). Then, the PWM signal generator 22D of the controller 20D determines whether now is the updating timing TR of the voltage command vector Vs* (step S22).

If it is determined that now is the updating timing TR of the voltage command vector Vs* (if Yes at step S22), the PWM signal generator 22D selects a voltage vector based on the voltage command vector Vs* (step S23). The PWM signal generator 22D calculates the output period of the selected voltage vector (step S24).

Next, the PWM signal generator 22D determined whether it is the second mode (step S25). For example, if the voltage command V* is smaller than a predetermined value, the PWM signal generator 22D determines that it is the second mode.

If it is determined that it is the second mode (if Yes at step S25), the PWM signal generator 22D makes the output periods of multiple zero voltage vectors become the output period of one zero voltage vector (step S26).

If the processing of step S26 is completed or if it is determined at step S25 that it is not the second mode (if No at step S25), the PWM signal generator 22D generates PWM signals PA, PB, and PC based on the output period of voltage vectors (step S27).

Meanwhile, the method for controlling the power converting apparatus relating to the present embodiment may include, e.g., a command generating process and a signal generating process, and correspond to the processing follow of the controller 20D and/or its elements as described above. Specifically, the processing flow at step S21 may be an example or an element of the command generating process, and the processing follow at steps S22 to S27 may be an example or an element of the signal generating process. Further, the controller 20D may also be an example of the control device relating to the present embodiment, and, similarly to the controller 20, include a microcomputer and various kinds of circuits. The CPU of the microcomputer realizes control of the command generator 21D and the PWM signal generator 22D by reading out and executing a program stored in the ROM. One or all of the command generator 21D and the PWM signal generator 22D may be configured by the hardware such as an ASIC, an FPGA or the like.

[Sixth Embodiment]

Next, description will be made on a power converting apparatus relating to a sixth embodiment. The power converting apparatus relating to the sixth embodiment differs from the power converting apparatus 1C relating to the fourth embodiment in that the power converting apparatus of the sixth embodiment generates a PWM signal using a space vector method. In the following description, the constituent elements having the same functions as those of the power converting apparatuses 1C and 1D will be designated by like reference symbols. No duplicate description will be made thereon.

Figure 17:
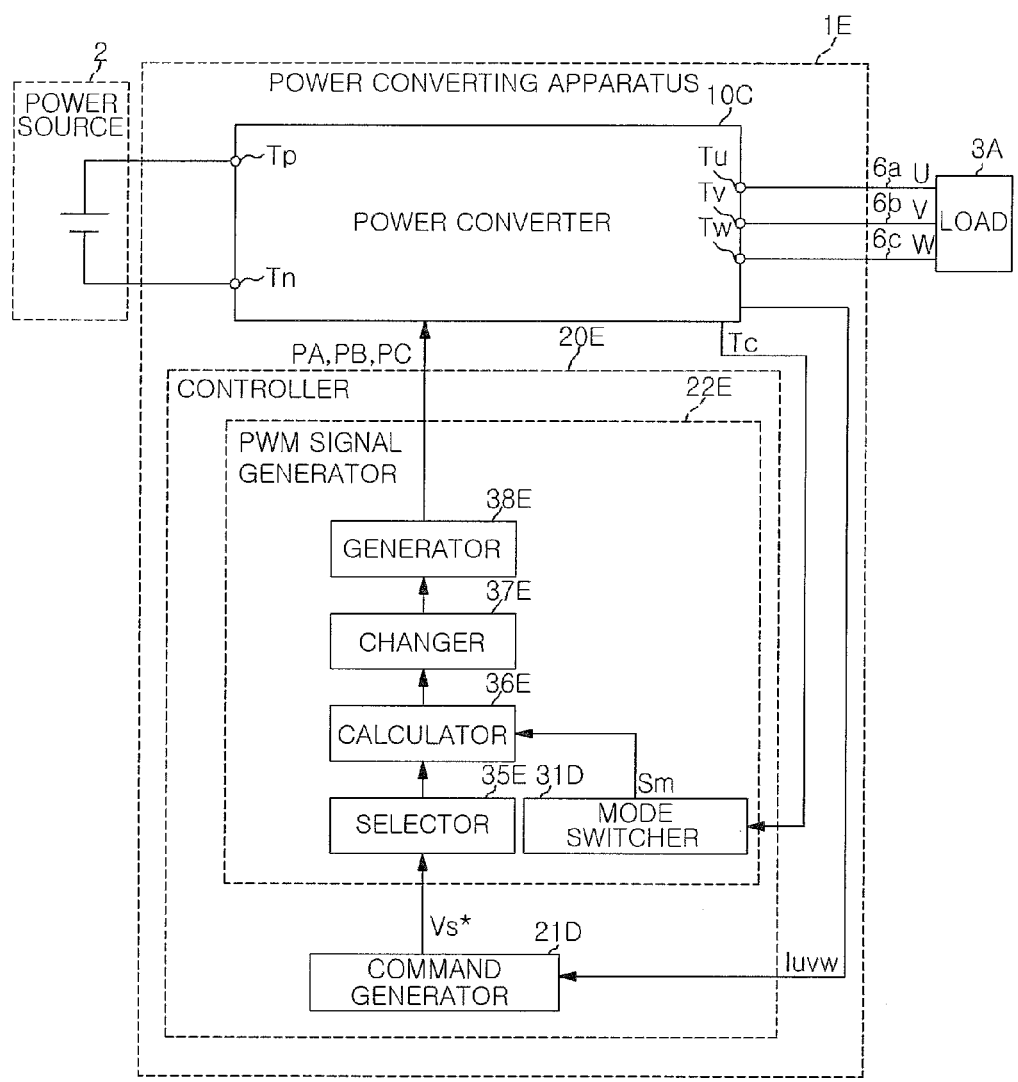
FIG. 17 is a view showing a configuration example of a power converting apparatus relating to a sixth embodiment.

FIG. 17 is a view showing a configuration example of a power converting apparatus 1E relating to the sixth embodiment. The power converting apparatus 1E includes a power converter 10C and a controller 20E and outputs a three-phase AC current to a load 3A. A configuration example of the controller 20E will now be described in detail.

As shown in FIG. 17, the controller 20E includes a command generator 21D and a PWM signal generator 22E. The PWM signal generator 22E includes a mode switcher 31D, a selector 35E, a calculator 36E, a changer 37E, and a generator 38E.

Figure 18:
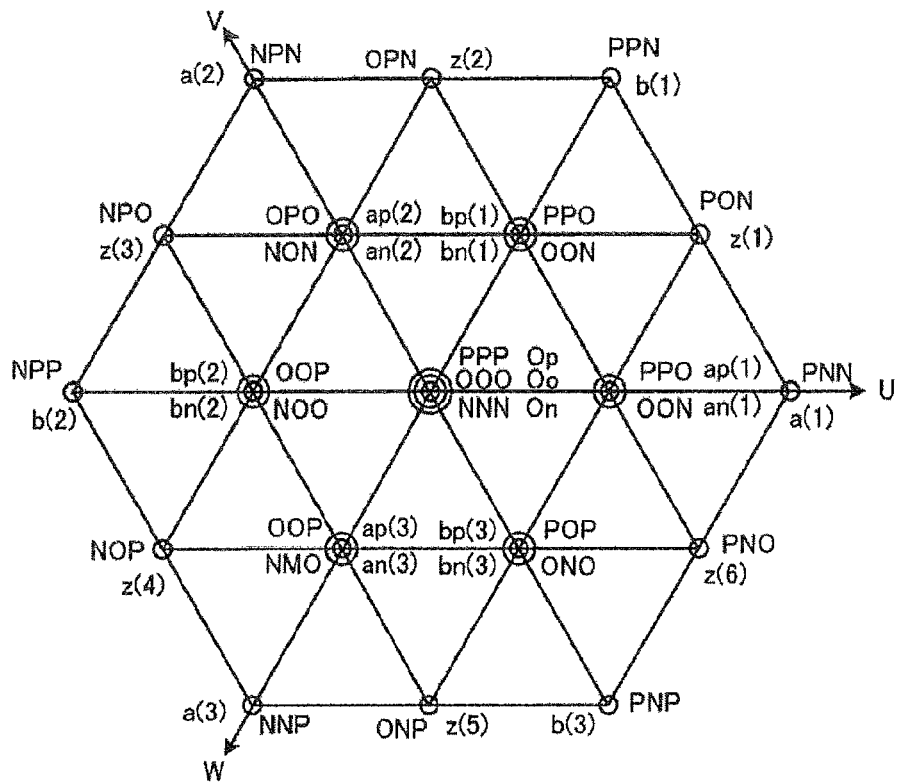
FIG. 18 is an explanatory view of a space vector method.

Based on a voltage command vector Vs* (one example of a voltage command), every updating cycle Ts, the selector 35E selects a combination of three zero voltage vectors and four non-zero voltage vectors from twenty seven kinds of voltage vectors. FIG. 18 is an explanatory view of a space vector method.

In FIG. 18, there are shown three zero voltage vectors Op, Om, and On, and twenty four non-zero voltage vectors a(1)~a(3), b(1)~b(3), ap(1)~ap(3), an(1)~an(3), bp(1)~bp(3), bn(1)~bn(3), and z(1)~z(6).

Figure 19:
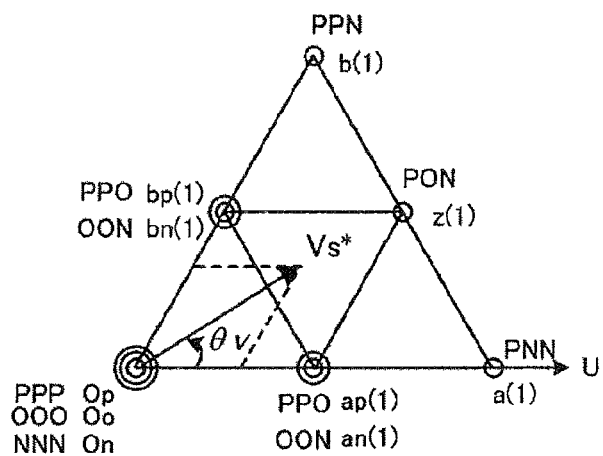
FIG. 19 is a view showing a correspondence example of a voltage command vector and space vectors.

FIG. 19 is a view showing a correspondence example of a voltage command vector Vs* and space vectors. If the voltage command vector Vs* is in the state shown in FIG. 19, the selector 35E selects, for example, four non-zero voltage vectors ap, an, bp, and bn, and three zero voltage vectors Op, Oo, and On which adjoin the voltage command vector Vs*.

In this case, every updating cycle Ts, the selector 35E alternately switches, for example, a pattern (hereinafter referred to as "first selection pattern") in which the selector 35E selects the voltage vectors in the order of On→an→bn→Oo→ap→bp→Op and a pattern (hereinafter referred to as "second selection pattern") in which the selector 35E selects the voltage vectors in the order of Op→bp→ap→Oo→bn→an→On which is the reverse order of that of the first selection pattern. In FIG. 19, for example, PPO indicates the output states of the U-phase, V-phase, and W-phase of the voltage vector ap(1) and shows a state in which the switching elements Q21, Q22, Q31, and Q32 existing above the U-phase and the V-phase are turned on and in which the switching elements Q42 and Q43 existing at the center of the W-phase are turned on.

The calculator 36E (which may also be called "an output period calculator") outputs the information on the output periods of the voltage vectors to the changer 37E in the order of the voltage vectors selected by the selector 35E. For example, if the voltage vectors of the first selection pattern are selected by the selector 35E, the calculator 36E outputs the information on the output periods in the order of the voltage vectors On, an, bn, Oo, ap, bp, and Op.

The calculator 36E calculates output periods of the voltage vectors selected by the selector 35E. For example, if the non-zero voltage vectors ap, an, bp, and bn are selected by the selector 35E, the calculator 36E finds output periods tap, tan, tbp, and tbn of the respective non-zero voltage vectors ap, an, bp, and bn.

Furthermore, the calculator 36E finds output periods top, too, and ton of the zero voltage vectors Op, Oo, and On by dividing a period (=Ts−tap−tan−tbp−tbn) obtained by subtracting the total sum of the output periods tap, tan, tbp, and tbn from the updating cycle Ts, into three periods.

If the mode signal Sm indicative of the first mode is outputted from the mode switcher 31D, the changer 37E outputs the information on the output periods acquired from the command updater 32C as it is. For example, upon acquiring the information on the output periods ton, tan, tbn, too, tap, tbp, and top from the calculator 36E, the changer 37E outputs the information on the output periods ton, tan, tbn, too, tap, tbp, and top as it is.

On the other hand, if the mode signal Sm indicative of the second mode is outputted from the mode switcher 31D, the changer 37E changes the output periods of three or more zero voltage vectors such that the output periods of three or more zero voltage vectors among the output periods calculated by the calculator 36E are replaced by the output period of one zero voltage vector corresponding to the total sum output period of three or more zero voltage vectors.

For example, upon acquiring the information on the output periods ton, tan, tbn, too, tap, tbp, top from the calculator 36E, the changer 37E adds up the output periods ton, too, and top. The addition result is used as a new output period too. The output periods ton and top are made 0. Thus, three zero voltage vectors to be outputted is changed to one.

If the addition result is used as a new output period too as mentioned above, the changer 37E sequentially outputs the information on the output periods tan, tbn, too, tap, and tbp.

Based on the information on the output periods outputted from the changer 37E, the generator 38E (which may also be called "a generating circuit") generates PWM signals PA, PB, and PC. The generator 38E outputs the generated PWM signals PA, PB, and PC to the power converter 10C (the gate drive circuit 11C).

Figure 20A:
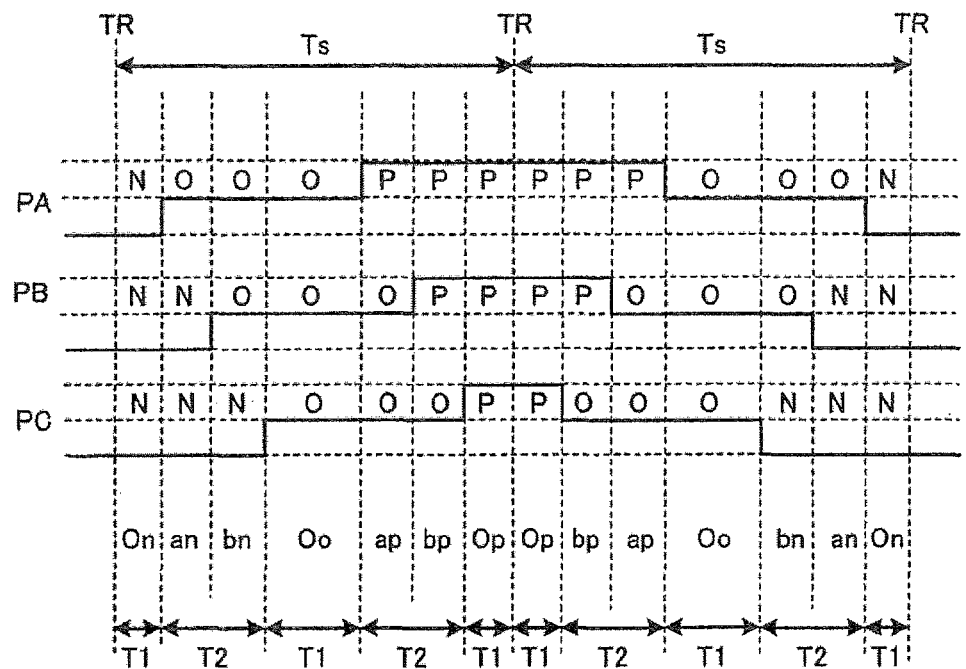
FIG. 20A is a view showing a relationship between a voltage vector, an output period and a PWM signal in a first mode.

For example, upon sequentially acquiring, as the information on the output periods in the first mode, the information on the output periods ton, tan, tbn, too, tap, tbp, and top and the information on the output periods top, tbp, tap, too, tbn, tan, and ton from the changer 37E, the generator 38E generates PWM signals PA, PB, and PC as shown in FIG. 20A. FIG. 20A is a view showing the relationship between the voltage vectors, the output periods and the PWM signals in the first mode.

Figure 20B:
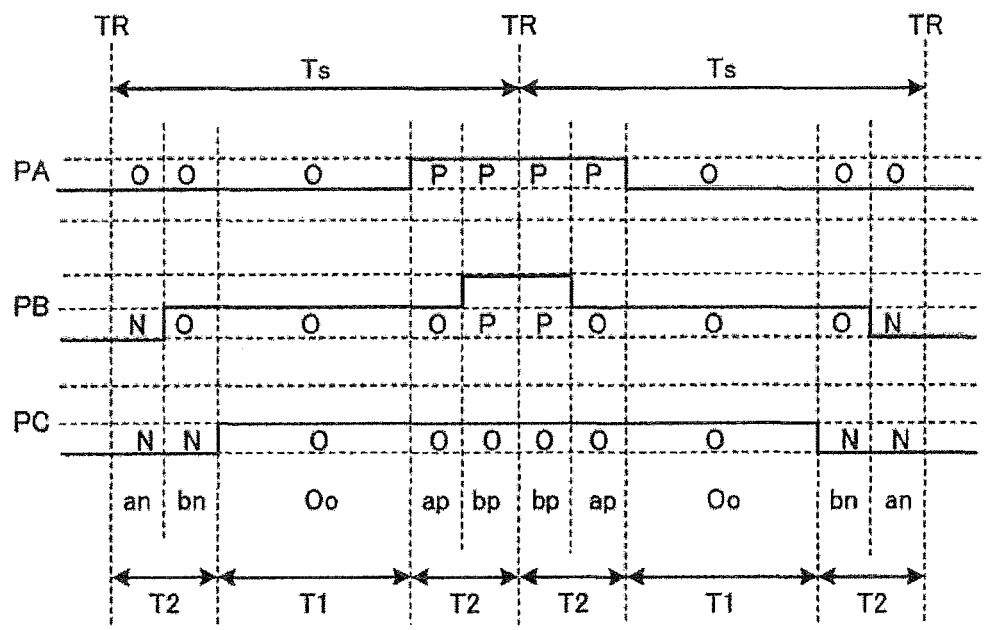
FIG. 20B is a view showing a relationship between a voltage vector, an output period and a PWM signal in a second mode.

Furthermore, upon acquiring, as the information on the output periods in the second mode, the information on the output periods tan, tbn, too, tap, and tbp and the information on the output periods tbp, tap, too, tbn, and tan from the changer 37E, the generator 38E generates PWM signals PA, PB, and PC as shown in FIG. 20B. FIG. 20B is a view showing the relationship between the voltage vectors, the output periods and the PWM signals in the second mode.

As shown in FIG. 20B, in case of the second mode, the generator 38E generates PWM signals PA, PB, and PC in which the output period too changed by the changer 37E is used as a first period T1 and in which four output periods tan, tbn, tap, and tbp of non-zero voltage vectors an, bn, ap, and by are used as four second periods T2.

Thus, in the second mode, just like the power converting apparatus 1C, the power converting apparatus 1E can make the number of turn-on times of a PWM pulse, namely the number of switching times, equal to two thirds of that available in the first mode. This makes it possible to reduce a switching loss while suppressing an increase in the dead time.

In the foregoing description, the order of the voltage command vectors Vs* is set by the selector 35E. Alternatively, the order of the voltage command vectors may be set by the generator 38E. In this case, the generator 38E sets the order of the voltage vectors based on, e.g., the voltage command vectors Vs* and the mode signals Sm.

The flow of the processing in the controller 20E is the same as the flow of the processing shown in FIG. 16. Therefore, no further detailed description will be made thereon.

Meanwhile, the method for controlling the power converting apparatus relating to the present embodiment may include, e.g., a command generating process and a signal generating process, and correspond to the processing follow of the controller 20E and/or its elements as described above.

Specifically, the processing flow at step S21 as shown in FIG. 16 may be an example or an element of the command generating process, and the processing follow at steps S22 to S27 as shown in FIG. 16 may be an example or an element of the signal generating process.

Further, the controller 20E may also be an example of the control device relating to the present embodiment, and, similarly to the controller 20, include a microcomputer and various kinds of circuits. The CPU of the microcomputer realizes control of the command generator 21D and the PWM signal generator 22E by reading out and executing a program stored in the ROM. One or all of the command generator 21D and the PWM signal generator 22E may be configured by the hardware such as an ASIC, an FPGA or the like.

[Seventh Embodiment]

Next, description will be made on a power converting apparatus relating to a seventh embodiment. The power converting apparatus relating to the seventh embodiment differs from the power converting apparatus 1B relating to the third embodiment in that the power converting apparatus of the seventh embodiment generates a PWM signal in which one first period T1 is set by executing a state inversion process with respect to the PWM signal outputted from a PWM signal generator. In the following description, the constituent elements having the same functions as those of the power converting apparatus 1B will be designated by like reference symbols. No duplicate description will be made thereon.

Figure 21:
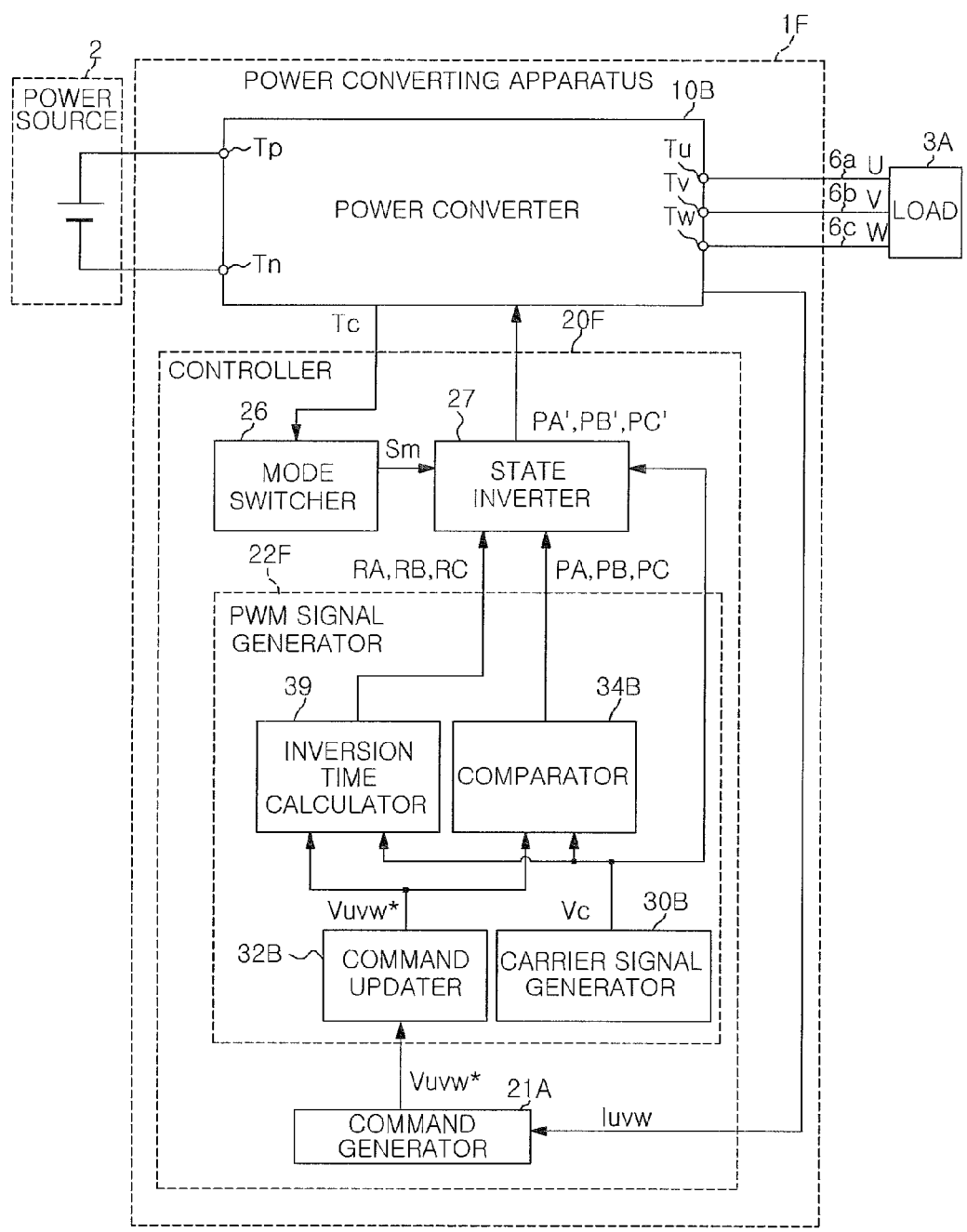
FIG. 21 is a view showing a configuration example of a power converting apparatus relating to a seventh embodiment.

FIG. 21 is a view showing a configuration example of a power converting apparatus 1F relating to the seventh embodiment. The power converting apparatus 1F includes a power converter 10B and a controller 20F and outputs a three-phase AC current to a load 3A. A configuration example of the controller 20F will now be described in detail.

As shown in FIG. 21, the controller 20F includes a command generator 21A, a PWM signal generator 22F, a mode switcher 26, and a state inverter 27.

The PWM signal generator 22F includes a carrier signal generator 30B, a command updater 32B, a comparator 34B, and an inversion time calculator 39. Using the carrier signal generator 30B, the command updater 32B, and the comparator 34B, the PWM signal generator 22F generates PWM signals PA, PB, and PC which are the same as those generated when the PWM signal generator 22B relating to the third embodiment is operated in the first mode.

The inversion time calculator 39 determines the states of the PWM signals PA, PB, and PC, based on the peak value Vp and the bottom value Vb of the carrier signal Vc and the phase voltage commands Vu*, Vv*, and Vw*, and calculates the inversion time of each of the PWM signals PA, PB, and PC.

Figure 22:
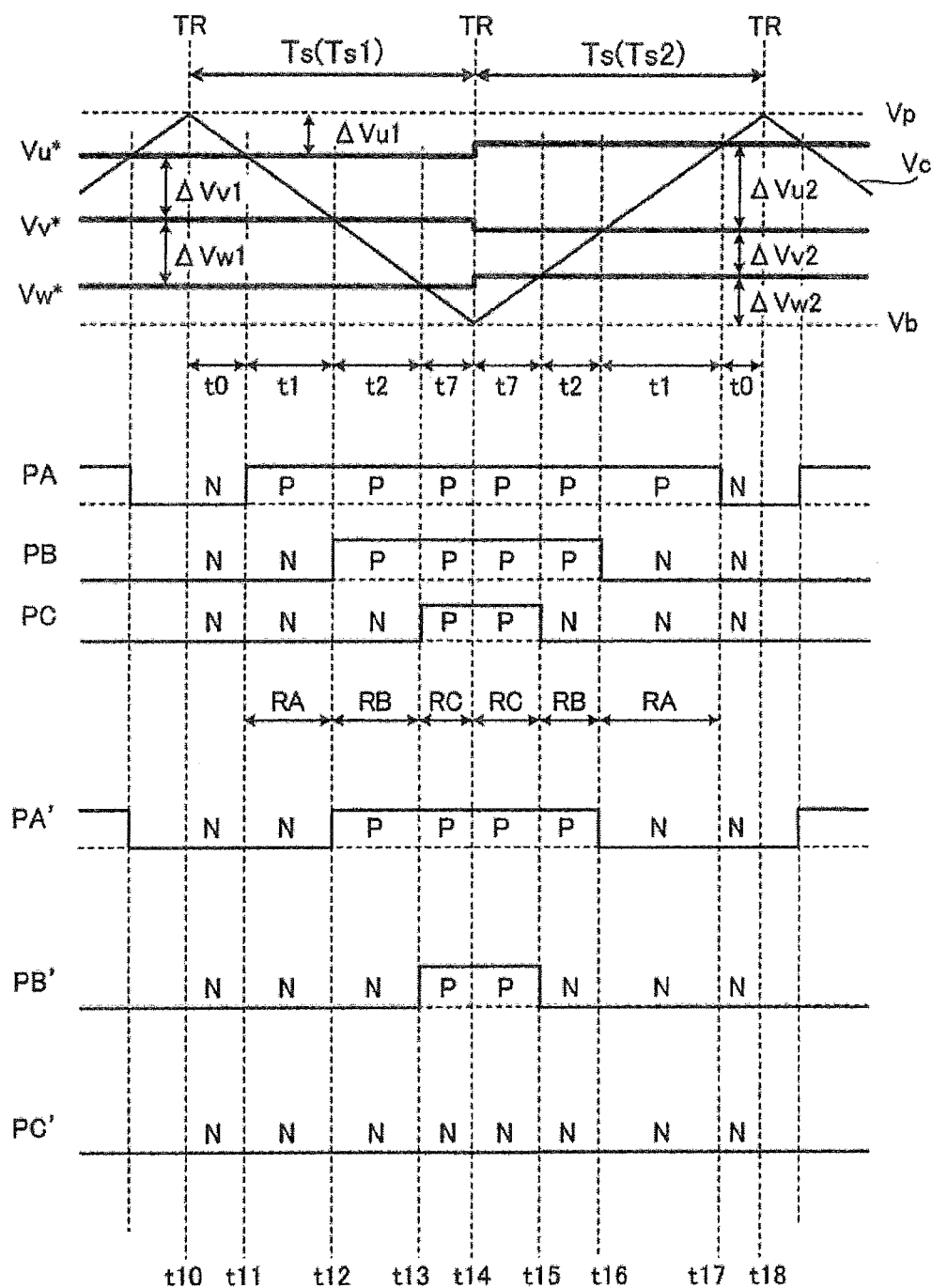
FIG. 22 is an explanatory view of a method for calculating the inversion time of each of PWM signals.

FIG. 22 is an explanatory view of a method for calculating the inversion time of each of the PWM signals PA, PB, and PC. Description will now be made on a period Ts1 in which the carrier signal Vc migrates from the peak to the bottom and a period Ts2 in which the carrier signal Vc migrates from the bottom to the peak.

In the period Ts1, the inversion time calculator 39 calculates a difference $\Delta Vu1$ between the peak value Vp of the carrier signal Vc and the phase voltage command Vu* and calculates an output period t0 of a zero voltage (NNN) based on the difference $\Delta Vu1$. Furthermore, the inversion time calculator 39 calculates a difference $\Delta Vv1$ between the phase voltage command Vu* and the phase voltage command Vv* and calculates an output period t1 of a non-zero voltage (PNN) based on the difference $\Delta Vv1$.

Moreover, the inversion time calculator 39 calculates a difference $\Delta Vw1$ between the phase voltage command Vv* and the phase voltage command Vw* and calculates an output period t2 of a non-zero voltage (PPN) based on the difference $\Delta Vw1$. In addition, the inversion time calculator 39 calculates an output period t7 of a zero voltage vector (PPP) from the output periods t0, t1, and t2.

The inversion time calculator 39 sets, using the output period t7, an inverting time RA for the PWM signal PA to range from the time t11 to the time t12 and sets, using the output period t1, an inverting time RB for the PWM signal PB to range from the time t12 to the time t13.

Furthermore, the inversion time calculator 39 sets, using the output period t2, an inverting time RC for the PWM signal PC to range from the time t13 to the time t14.

In the period Ts2, the inversion time calculator 39 calculates a difference ΔVw2 between the bottom value Vb of the carrier signal Vc and the phase voltage command Vw* and calculates an output period t7 of a zero voltage (PPP) based on the difference ΔVw2. Furthermore, the inversion time calculator 39 calculates a difference ΔVv2 between the phase voltage command Vw* and the phase voltage command Vv* and calculates an output period t2 of a non-zero voltage (PPN) based on the difference ΔVv2.

Moreover, the inversion time calculator 39 calculates a difference ΔVu2 between the phase voltage command Vv* and the phase voltage command Vu* and calculates an output period t1 of a non-zero voltage (PNN) based on the difference ΔVu2. In addition, the inversion time calculator 39 calculates an output period t0 of a zero voltage vector (NNN) from the output periods t7, t2, and t1.

The inversion time calculator 39 sets, using the output period t7, an inverting time RA for the PWM signal PA to range from the time t16 to the time t17 and sets, using the output period t2, an inverting time RB for the PWM signal PB to range from the time t15 to the time t16. Furthermore, the inversion time calculator 39 sets, using the output period t1, an inverting time RC for the PWM signal PC to range from the time t14 to the time t15.

Just like the mode switcher 31B, the mode switcher 26 switches the first mode and the second mode depending on the mode signal Sm. For example, if the detection temperature Tc is lower than a predetermined value, the mode switcher 26 outputs the mode signal Sm indicative of the first mode to the state inverter 27. If the detection temperature Tc is equal to or higher than the predetermined value, the mode switcher 26 outputs the mode signal Sm indicative of the second mode to the state inverter 27.

If the mode signal Sm indicative of the first mode is outputted from the mode switcher 26, the state inverter 27 directly outputs the PWM signals PA, PB, and PC inputted from the PWM signal generator 22F, as PWM signals PA', PB', and PC'.

Thus, every updating cycle Ts of the phase voltage command Vuvw*, the controller 20F can repeatedly outputs the PWM signals PA', PB', and PC' having a control pattern in which the PWM signals PA', PB', and PC' migrate in the order of a first period T1, a second period T2, and a first period T1.

On the other hand, if the mode signal Sm indicative of the second mode is outputted from the mode switcher 26, the state inverter 27 inverts a part of each of the PWM signals PA, PB, and PC based on the inverting time RA, RB, and RC and generates and outputs PWM signals PA', PB', and PC'.

For example, the state inverter 27 inverts the PWM signal PA and generates PWM signal PA' during the period between the time t11 and the time t12 and during the period between the time t16 and the time t17. Furthermore, the state inverter 27 inverts the PWM signal PB and generates PWM signal PB' during the period between the time t12 and the time t13 and during the period between the time t15 and the time t16. Moreover, the state inverter 27 inverts the PWM signal PC and generates PWM signal PC' during the period between the time t13 and the time t14 and during the period between the time t14 and the time t15.

Thus, in the second mode, every updating cycle Ts, the controller 20F alternately outputs a PWM signal having a control pattern in which the PWM signal migrates in the order of a first period T1 and a second period T2 during one updating cycle Ts and a PWM signal having a control pattern in which the PWM signal migrates in the order of a second period T2 and a first period T1 during one updating cycle Ts.

Accordingly, in the second mode, just like the power converting apparatus 1B, the power converting apparatus 1F can make the number of turn-on times of a PWM pulse, namely the number of switching times, equal to two thirds of that available in the first mode. This makes it possible to reduce a switching loss while suppressing an increase in the dead time.

Just like the power converting apparatus 1F, the power converting apparatus 1C relating to the fourth embodiment may be provided with an inversion time calculator and a state inverter in place of the shifter 33C. In this case, the inversion time calculator calculates the output periods of the respective zero voltages On, Oo, and Op and the output periods of the respective non-zero voltages an, bn, ap, and by from the peak value Vp and the bottom value Vb of the carrier signal Vc and the phase voltage command Vuvwpn* and calculates the inverting time RA, RB, and RC from these output periods. The state inverter inverts a part of each of the PWM signals PA, PB, and PC, based on the inverting time RA, RB, and RC, and generates and outputs PWM signals PA', PB', and PC'.

Just like the power converting apparatus 1F, the power converting apparatus 1 relating to the first embodiment may be provided with an inversion time calculator and a state inverter in place of the shifter 33. In this case, the inversion time calculator calculates the output periods of the respective zero voltages and the output periods of the respective non-zero voltages from the peak value Vp of the carrier signal Vc1 or the bottom value Vb of the carrier signal Vc2 and the voltage command V* and calculates the inverting time from these output periods. The state inverter inverts a part of each of the PWM signals L1, L2, R1, and R2 based on the inverting time.

Further, the controller 20F may also be an example of the control device relating to the present embodiment, and, similarly to the controller 20, include a microcomputer and various kinds of circuits. The CPU of the microcomputer realizes control of the command generator 21A, the PWM signal generator 22F, the mode switcher 26, and the state inverter 27 by reading out and executing a program stored in the ROM. One or all of the command generator 21A, the PWM signal generator 22F, the mode switcher 26, and the state inverter 27 may be configured by the hardware such as an ASIC, an FPGA or the like.

[Eighth Embodiment]

Next, description will be made on a power converting apparatus relating to an eighth embodiment. The power converting apparatus relating to the eighth embodiment differs from the power converting apparatus 1F relating to the seventh embodiment in that the power converting apparatus of the eighth embodiment generates a PWM signal in which one first period T1 is set by executing a state inversion process with respect to the output of a gate drive circuit. In the following description, the constituent elements having the same functions as those of the power converting apparatus 1F will be designated by like reference symbols. No duplicate description will be made thereon.

Figure 23:
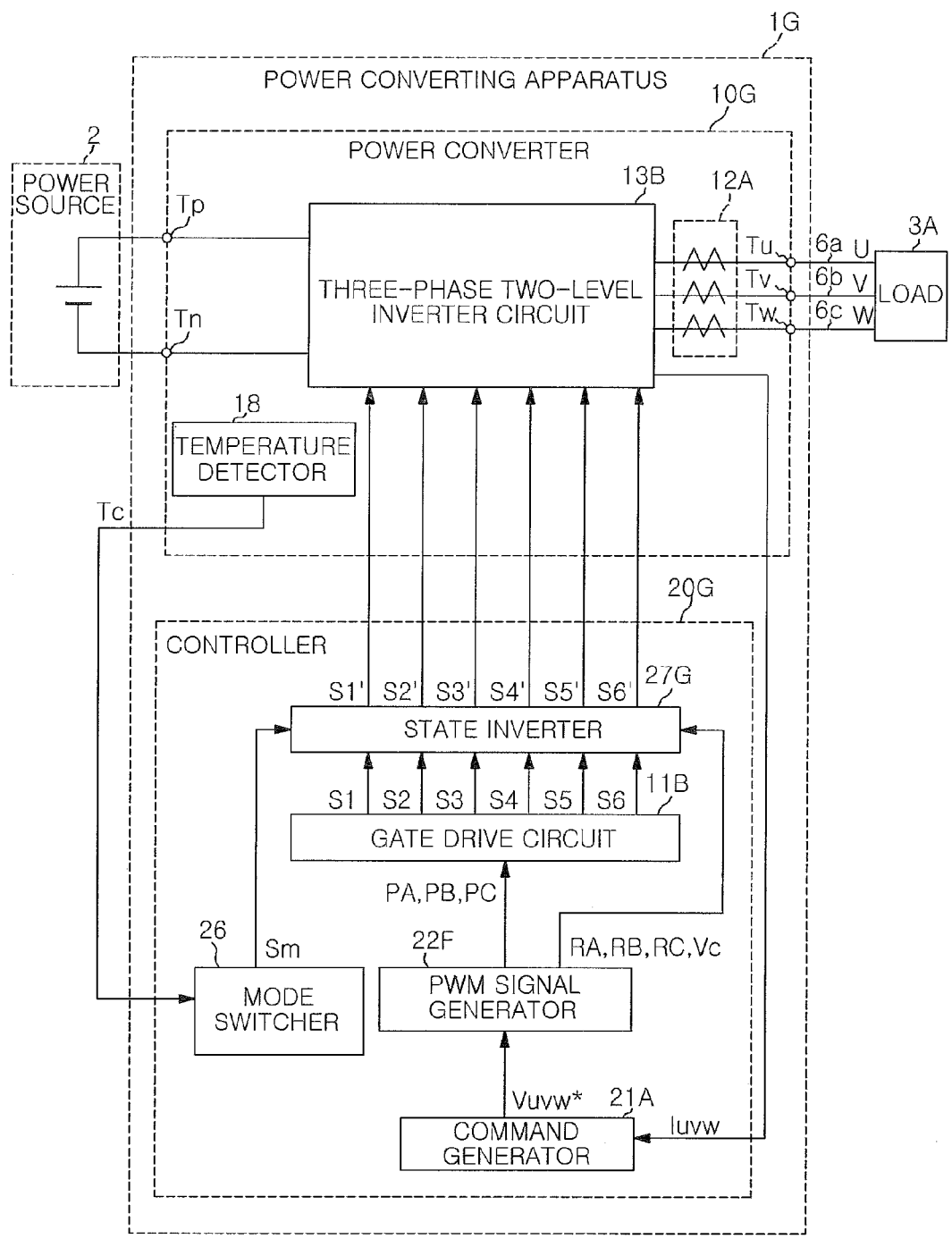
FIG. 23 is a view showing a configuration example of a power converting apparatus relating to an eighth embodiment.

FIG. 23 is a view showing a configuration example of a power converting apparatus 1G relating to the eighth embodiment. As shown in FIG. 23, the power converting apparatus 1G may include a power converter 10G and a controller 20G and output a three-phase AC current to a load 3A. The power converter 10G may include a three-phase two-level inverter circuit 13B and a current detector 12A.

The controller 20G may include a command generator 21A, a PWM signal generator 22F, a mode switcher 26, a gate drive circuit 11B, and a state inverter 27G. The PWM signal generator 22F generates PWM signals PA, PB, and PC which are the same as those generated when the PWM signal generator 22B is operated in the first mode.

If the mode signal Sm indicative of the first mode is outputted from the mode switcher 26, the state inverter 27G directly outputs the gate signals S1 to S6 inputted from the gate drive circuit 11B, as gate signals S1' to S6'. The gate signals S1 to S6 and S1' to S6' are PWM signals but will be referred to as "gate signals" in order to distinguish them from the PWM signals PA, PB, and PC.

Thus, every updating cycle Ts of the phase voltage command Vuvw*, the controller 20G can repeatedly output a PWM signal having a control pattern in which the PWM signal migrates in the order of a first period T1, a second period T2 and a first period T1.

On the other hand, if the mode signal Sm indicative of the second mode is outputted from the mode switcher 26, the state inverter 27G inverts a part of each of the gate signals S1 to S6 inputted from the gate drive circuit 11B, based on the inverting time RA, RB, and RC and the carrier signal Vc, and generates and outputs gate signals S1' to S6'.

For example, the state inverter 27G inverts the gate signals S1 and S2 and generates gate signals S1' and S2' during the period between the time t11 and the time t12 and during the period between the time t16 and the time t17. Furthermore, the state inverter 27G inverts the gate signals S3 and S4 and generates gate signals S3' and S4' during the period between the time t12 and the time t13 and during the period between the time t15 and the time t16. Moreover, the state inverter 27G inverts the gate signals S5 and S6 and generates gate signals S5' and S6' during the period between the time t13 and the time t14 and during the period between the time t14 and the time t15.

Thus, in the second mode, every updating cycle Ts, the controller 20G alternately outputs a PWM signal having a control pattern in which the PWM signal migrates in the order of a first period T1 and a second period T2 during one updating cycle Ts and a PWM signal having a control pattern in which the PWM signal migrates in the order of a second period T2 and a first period T1 during one updating cycle Ts.

Accordingly, in the second mode, just like the power converting apparatus 1B, the power converting apparatus 1G can make the number of turn-on times of a PWM pulse, namely the number of switching times, equal to two thirds of that available in the first mode. This makes it possible to reduce a switching loss while suppressing an increase in the dead time.

While description has been made on an example in which the controllers 20, 20B to 20G, and 17 relating to the aforementioned embodiments do not change the updating cycle Ts, it may be possible to, in addition to the mode switching, change the updating cycle Ts depending on, e.g., the frequency of the output voltage (or the voltage command).

While the controllers 20, 20B to 20G, and 17 relating to the aforementioned embodiments are configured to change the modes based on the temperature of the power converting apparatuses 1 and 1A to 1G, it may be possible to change the modes based on, e.g., the frequency of the output voltage (or the voltage command) and the distortion of the output voltage.

For example, the mode switchers 26, 31, and 31B of the power converting apparatuses 1 and 1A to 1G select the first mode if the frequency of the output voltage (or the voltage command) is equal to or higher than a predetermined value and select the second mode if the frequency of the output voltage (or the voltage command) is lower than the predetermined value.

As another example, the power converting apparatuses 1 and 1A to 1G may include a distortion detector for detecting distortion of an output voltage. In this case, the mode switchers 26, 31, and 31B select the first mode if the distortion of the output voltage detected by the distortion detector is smaller than a predetermined value and select the second mode if the distortion of the output voltage is equal to or larger than the predetermined value.

The command generators 21, 21A, 21C, and 21D may generate the voltage command V* or Vuvw* using, e.g., the voltage command of a dq-axis component of rectangular coordinates which rotate in synchronism with the phase of the output voltage of the power converter 10, 10A, 10B, 100 or 10G or the phase (electric angle) of the load 3 or 3A.

In the second mode, the PWM signal generators 22 and 22B to 22G may use one of the bottom and the peak of the carrier signal as the updating timing of the voltage command.

In the description made above, the power converting apparatus 1 relating to the first embodiment generates the PWM signal for the single-phase inverter circuit 13 using the carrier comparison method. Alternatively, just like the power converting apparatuses 1C and 1D relating to the fourth and fifth embodiments, the power converting apparatus 1 may generate the PWM signal for the single-phase inverter circuit 13 using the space vector method. In the aforementioned embodiments, description has been made on the PWM signal for the inverter circuit of three levels or less. Even in case of the PWM signal for the inverter circuit of more than three levels, it is possible to reduce a switching loss while suppressing an increase in the dead time, by outputting a PWM signal in which one first period T1 and one or more second periods T2 are combined with each other.

Other new effects, modifications, combinations, sub-combinations, and alterations can be readily derived by those skilled in the relevant art. For that reason, the broad aspect of the present disclosure is not limited to the specific details and the representative embodiments shown and described above. Accordingly, the present disclosure can be modified in many different forms depending on design requirements and other factors without departing from the spirit and scope thereof defined by the appended claims and the equivalents thereof.

What is claimed is:

1. A power converting apparatus for converting electric power between a power source and a load, comprising:
   a power converter configured to output a voltage to the load; and
   a controller configured to output a PWM signal which is generated in response to a voltage command to the power converter,
   wherein the power converter includes a plurality of switching elements driven based on the PWM signal,
   wherein the controller is configured to generate the PWM signal such that a first period during which a zero voltage is outputted and a second period during which a non-zero voltage is outputted are adjusted according to the voltage command, wherein the controller is configured to output the PWM signal which is set such that one first period and one or more second periods exist within an updating cycle of the voltage command, to the power converter, wherein the controller includes a PWM signal generator configured to generate the PWM signal, wherein the PWM signal generator is configured to alternately output the PWM signal having a first pattern and the PWM signal having a second pattern to the power converter, the first pattern being set such that one first period and one second period exist within the updating cycle and the first period is followed by the second period, the second pattern being set such that one first period and one second period exist within the updating cycle and the second period is followed by the first period, wherein the controller is configured to be operable in any one of a first mode and a second mode, wherein, in the first mode, the PWM signal generator repeatedly outputs, for each updating cycle of the voltage command, a PWM signal having a third pattern to the power converter, the third pattern being set to sequentially cause the first period, the second period, and the first period in that order, wherein, in the second mode, the PWM signal generator alternately outputs, for each updating cycle of the voltage command, the PWM signal having the first pattern and the PWM signal having the second pattern to the power converter, and wherein the PWM signal generator includes a mode switcher configured to switch the first mode and the second mode based on a preset condition.

2. The power converting apparatus of claim 1, wherein the voltage outputted by the power converter is an AC voltage having one or more phases, wherein the voltage command includes one or more phase voltage commands respectively corresponding to said one or more phases, wherein the controller further includes a command generator configured to generate said one or more phase voltage commands, and wherein the PWM signal generator includes:
a carrier signal generator configured to generate a carrier signal;
a comparator configured to compare each phase voltage command with the carrier signal and generate the PWM signal for each phase based on a result thereof; and
a shifter configured to relatively shift said phase voltage commands which are to be compared by the comparator, said phase voltage commends being relatively shifted with respect to the carrier signal generated from the carrier signal generator, based on one of a peak value and a bottom value of the carrier signal.

3. The power converting apparatus of claim 2, wherein the shifter is configured to shift the phase voltage commands such that a greatest one among the phase voltage commands becomes a peak value of the carrier signal or such that a smallest one among the phase voltage commands becomes a bottom value of the carrier signal.

4. The power converting apparatus of claim 3, wherein the power converter is configured as a multilevel output, wherein the command generator is configured to generate a first phase voltage command and a second phase voltage command with respect to each of the phases and output a plurality of first phase voltage commands and a plurality of second phase voltage commands, and wherein the shifter is configured to shift the first phase voltage commands such that the greatest one among the first phase voltage commands becomes the peak value of the carrier signal and shift the second phase voltage commands such that the smallest one among the second phase voltage commands becomes the bottom value of the carrier signal.

5. The power converting apparatus of claim 1, wherein the power converter is configured to selectively output one of the zero voltage and the non-zero voltage to the load.

6. The power converting apparatus of claim 1, wherein the controller is configured to output, for each updating cycle of the voltage command, the PWM signal which causes said one first period and said one or more second periods which are combined within said each updating cycle of the voltage command.

7. A control device for controlling the power converter of claim 1, comprising:
a command generator configured to generate the voltage command; and
a signal generator configured to generate the PWM signal such that the first period and the second period are adjusted according to the voltage command, and output the PWM signal to the power converter, wherein the signal generator is configured to output the PWM signal which is set such that one first period and one or more second periods exist within the updating cycle of the voltage command, to the power converter.

8. A method for controlling the power converting apparatus of claim 1, comprising:
a command generating process for generating the voltage command; and
a signal generating process for generating the PWM signal such that the first period and the second period during which a non-zero voltage is outputted are adjusted according to the voltage command, and outputting the PWM signal to the power converter, wherein the signal generating process includes outputting the PWM signal which is set such that one first period and one or more second periods exist within the updating cycle of the voltage command.

9. The method of claim 8, wherein, in the signal generating process, the PWM signal is outputted for each updating cycle of the voltage command, the PWM signal being set to cause said one first period and said one or more second periods which are combined within said each updating cycle.

10. The power converting apparatus of claim 1,
wherein the controller further includes a command generator configured to generate the voltage command, and
wherein the PWM signal generator includes:
a selector configured to select a combination of two or more zero voltage vectors and one or more non-zero voltage vectors from a plurality of voltage vectors based on the voltage command;
a calculator configured to calculate output periods of the voltage vectors selected by the selector;
a changer configured to change the output periods of said two or more zero voltage vectors such that the output periods of said two or more zero voltage vectors among the output periods calculated by the calculator are replaced by an output period of one zero voltage vector corresponding to a total sum of the output periods of said two or more zero voltage vectors; and a generator configured to generate the PWM signal which is set such that the output period of said one zero voltage vector is used as said one first period and the output periods of said one or more non-zero voltage vectors are used as said one or more second periods.

11. A power converting apparatus for converting electric power between a power source and a load, comprising:

a power converter configured to output a voltage to the load; and a controller configured to output a PWM signal which is generated in response to a voltage command to the power converter, wherein the power converter includes a plurality of switching elements driven based on the PWM signal, wherein the controller is configured to generate the PWM signal such that a first period during which a zero voltage is outputted and a second period during which a non-zero voltage is outputted are adjusted according to the voltage command, wherein the controller is configured to output the PWM signal which is set such that one first period and one or more second periods exist within an updating cycle of the voltage command, to the power converter, wherein the controller includes a PWM signal generator configured to generate the PWM signal, wherein the PWM signal generator is configured to repeatedly output, for each updating cycle of the voltage command, the PWM signal having a pattern to the power converter, the pattern being set to sequentially cause the second period, the first period and the second period in that order, wherein the controller is configured to be operable in any one of a first mode and a second mode, wherein, in the first mode, the PWM signal generator repeatedly outputs, for each updating cycle of the voltage command, a PWM signal having a pattern which is set to sequentially cause the first period, the second period, the first period, the second period, and the first period in that order, to the power converter, wherein, in the second mode, the PWM signal generator repeatedly outputs, for each updating cycle of the voltage command, the PWM signal having the pattern which is set to sequentially cause the second period, the first period, and the second period in that order, to the power converter, and wherein the PWM signal generator includes a mode switcher configured to switch the first mode and the second mode based on a preset condition.

12. The power converting apparatus of claim 11, wherein the controller further includes a command generator configured to generate the voltage command, and wherein the PWM signal generator includes:

a selector configured to select a combination of two or more zero voltage vectors and one or more non-zero voltage vectors from a plurality of voltage vectors based on the voltage command;

a calculator configured to calculate output periods of the voltage vectors selected by the selector;

a changer configured to change the output periods of said two or more zero voltage vectors such that the output periods of said two or more zero voltage vectors among the output periods calculated by the calculator are replaced by an output period of one zero voltage vector corresponding to a total sum of the output periods of said two or more zero voltage vectors; and a generator configured to generate the PWM signal which is set such that the output period of said one zero voltage vector is used as said one first period and the output periods of said one or more non-zero voltage vectors are used as said one or more second periods.

13. The power converting apparatus of claim 11, wherein the power converter is configured to selectively output one of the zero voltage and the non-zero voltage to the load.

14. The power converting apparatus of claim 11, wherein the controller is configured to output, for each updating cycle of the voltage command, the PWM signal which causes said one first period and said one or more second periods which are combined within said each updating cycle of the voltage command.

15. A control device for controlling the power converter of claim 11, comprising:

a command generator configured to generate the voltage command; and a signal generator configured to generate the PWM signal such that the first period and the second period are adjusted according to the voltage command, and output the PWM signal to the power converter, wherein the signal generator is configured to output the PWM signal which is set such that one first period and one or more second periods exist within the updating cycle of the voltage command, to the power converter.

16. A method for controlling the power converting apparatus of claim 11, comprising:

a command generating process for generating the voltage command; and a signal generating process for generating the PWM signal such that the first period and the second period are adjusted according to the voltage command, and outputting the PWM signal to the power converter, wherein the signal generating process includes outputting the PWM signal which is set such that one first period and one or more second periods exist within the updating cycle of the voltage command.

17. The method of claim 16, wherein, in the signal generating process, the PWM signal is outputted for each updating cycle of the voltage command, the PWM signal being set to cause said one first period and said one or more second periods which are combined within said each updating cycle.

* * * * *